(12) United States Patent
Eames

(10) Patent No.: US 6,208,637 B1
(45) Date of Patent: Mar. 27, 2001

(54) METHOD AND APPARATUS FOR THE GENERATION OF ANALOG TELEPHONE SIGNALS IN DIGITAL SUBSCRIBER LINE ACCESS SYSTEMS

(75) Inventor: Thomas R. Eames, Santa Rosa, CA (US)

(73) Assignee: Next Level Communications, L.L.P., Rohnert Park, CA (US)

( * ) Notice: Subject to any disclaimer, the term of this patent is extended or adjusted under 35 U.S.C. 154(b) by 0 days.

(21) Appl. No.: 09/231,665

(22) Filed: Jan. 15, 1999

Related U.S. Application Data

(63) Continuation-in-part of application No. 08/905,775, filed on Aug. 8, 1997.
(60) Provisional application No. 60/043,811, filed on Apr. 14, 1997.

(51) Int. Cl.[7] ............................... H04J 3/16; H04L 12/66
(52) U.S. Cl. ..................... 370/352; 370/389; 370/395; 709/227
(58) Field of Search ...................... 370/351, 352, 370/356, 389, 392, 395, 397, 487, 465, 466; 709/227

(56) References Cited

U.S. PATENT DOCUMENTS

| | | | |
|---|---|---|---|
| 4,819,228 | * 4/1989 | Baran et al. | 370/389 |
| 4,970,721 | * 11/1990 | Aczel et al. | 370/466 |
| 5,583,863 | * 12/1996 | Darr, Jr. et al. | 370/397 |
| 5,946,323 | * 8/1999 | Eakins et al. | 370/468 |
| 5,999,525 | * 12/1999 | Krishnaswamy et al. | 370/352 |

\* cited by examiner

Primary Examiner—Alpus H. Hsu
Assistant Examiner—Afsar M. Qureshi
(74) Attorney, Agent, or Firm—Covington & Burling

(57) ABSTRACT

A method and apparatus for providing analog telephony services over a digital subscriber loop access system is presented. Digital subscriber loop technologies including Asymmetric Digital Subscriber Loop (ADSL) leave existing POTs services undisturbed by utilizing spectrum above the POTs band for data services. An Asynchronous Transfer Mode (ATM) cell mapping is utilized on an ADSL linecard which permits flexible mapping of compressed or uncompressed voice signals into ATM cells along with overhead and signaling channels. Echo cancellation is used to enhance the voice quality in compressed voice signals. The ATM cells can be transmitted to a subscriber residence or a business and one to four additional analog telephony lines supported a receiving units, in addition to data services. This allows the first telephone line to be operated in the traditional manner as an analog connection over the twisted wire pair, data services provided in the ADSL connection, and additional phone lines to be supported without the installation of more twisted wire pair connections to the residence or business.

16 Claims, 20 Drawing Sheets

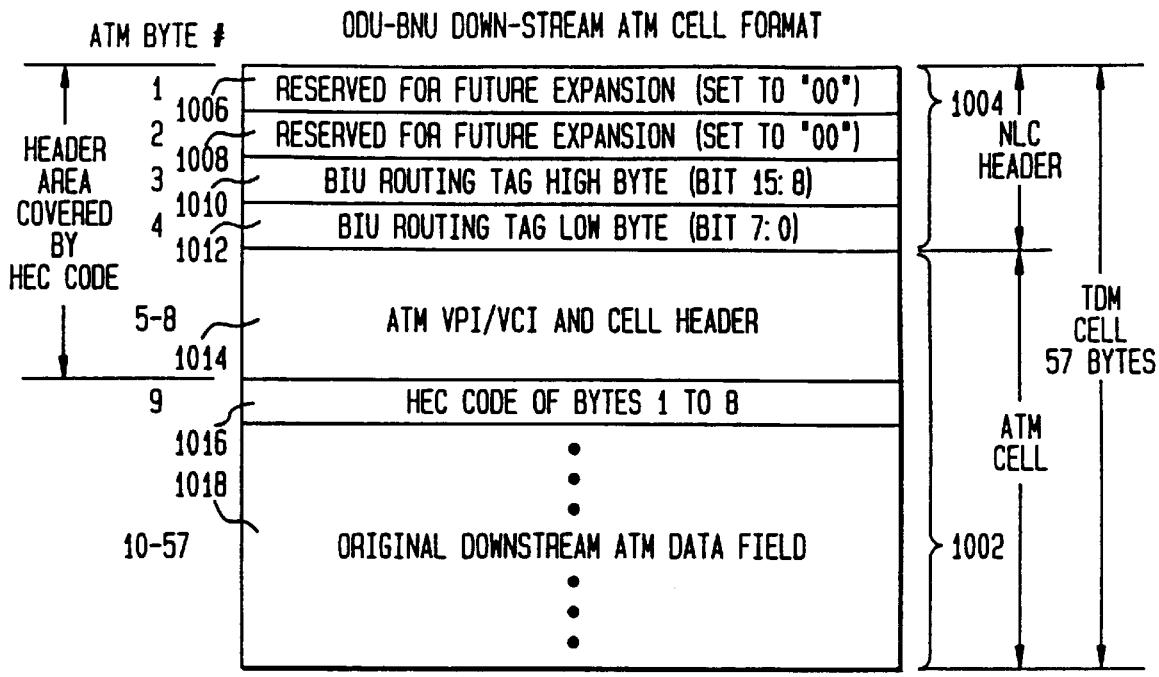
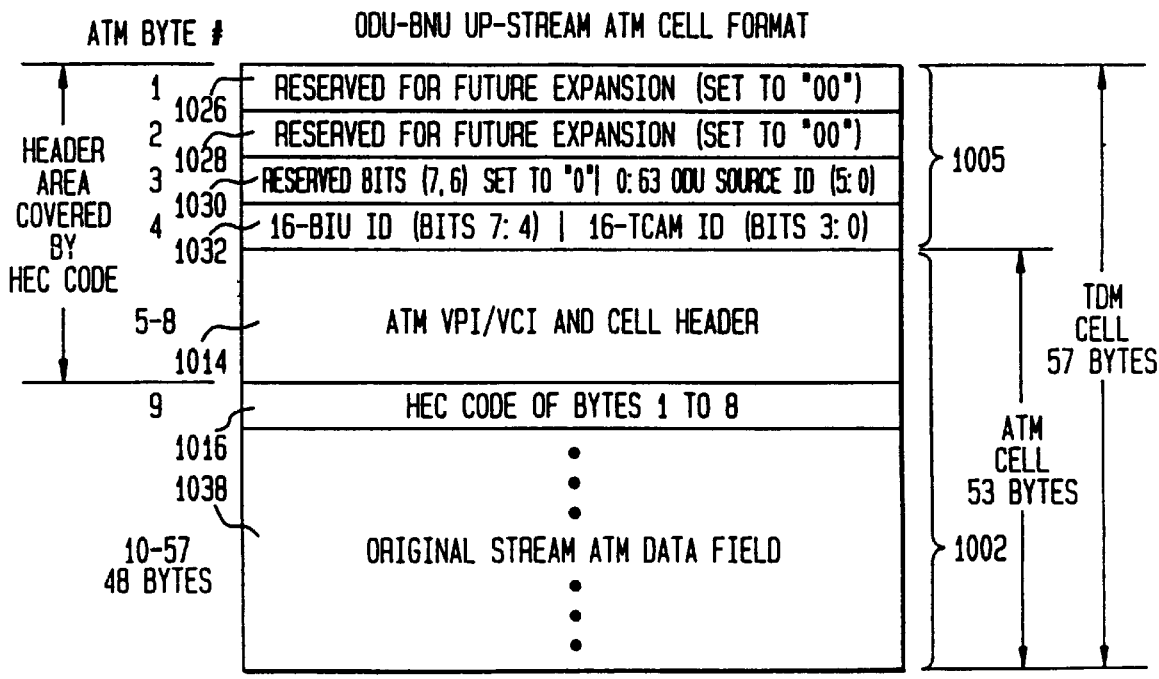

ODU-BNU TDM CELL FORMAT

TDM SEGMENT INDIVIDUAL DS0 MAPPING

TDM SEGMENT VT1.5 MAPPING

BASIC TDM BLOCK DS0 MAPPING

METHOD AND APPARATUS FOR THE GENERATION OF ANALOG TELEPHONE SIGNALS IN DIGITAL SUBSCRIBER LINE ACCESS SYSTEMS

CROSS-REFERENCES

This application is a continuation-in-part of application Ser. No. 08/905,775 filed on Aug. 8, 1997 and entitled "Unified Access Platform," of which Thomas R. Eames is the inventor, which claims the benefit of U.S. Provisional Application No. 60/043,811 filed on Apr. 14, 1997 entitled "Unified Access Platform" of which Thomas R. Eames is the inventor.

The aforementioned applications are incorporated herein by this reference, but are not admitted to be prior art.

FIELD OF THE INVENTION

The present invention relates to a method and apparatus for the generation of analog telephone signals in digital subscriber loop access system.

BACKGROUND OF THE INVENTION

The increasing demand for bandwidth has resulted in a need for equipment which can transmit both telephony and data signals from telephone central offices to subscriber residences and businesses. Because of the tremendous number of twisted wire pairs which are in place for the delivery of traditional phone services, telecommunications manufacturers have developed digital subscriber loop transmission systems which support the transport of digital data from telephone central offices to subscribers. Such systems offer the advantage that they can make use of the existing twisted wire pairs, although it is sometimes necessary to place electronics for sending and receiving these signals outside of the telephone central office and closer to the subscribers.

Digital subscriber loop systems offer the advantage of being able to provide data signals to subscribers, and in many instances allow traditional telephone services to be transmitted simultaneously with a digital signal. This allows the subscriber to have a primary phone line along with a high-speed digital data service.

However, if a twisted wire pair is being used to simultaneously provide a traditional analog phone service and high-speed data it cannot be used to provide additional phone lines using existing digital subscriber loop systems. This requires that a separate twisted wire pair be used if the subscriber wants to have a second phone line in addition to the primary phone line and high-speed data service.

For the foregoing reasons, there is a need for a method and apparatus which can provide analog phone service in a residence or business in a digital subscriber loop access system.

SUMMARY OF THE INVENTION

The present invention describes a method and apparatus for the simultaneous transport of data and telephony services over a fiber optic based infrastructure in which digital telephony signals and data signals are received at a telephone central office unit and combined for transmission over a fiber optic link to a second unit which can be located either in the telephone central office or in the field. At the second unit a digital subscriber loop signal is formed which has Asynchronous Transfer Mode (ATM) cells which contain either digital telephony signals or data signals. The ATM cells are transmitted to a residential receiving device which reconstructs the data signal for presentation at a user data interface and reconstructs an analog telephony signal for presentation at a user telephony interface.

In a preferred embodiment ATM cells which contain digital telephony information are spaced by 5 ms and can contain a single 64 kb/s channel formed using Pulse Code Modulation (PCM) techniques, two 32 kb/s channels formed using Adaptive Differential Pulse Code Modulation (ADPCM)techniques, or four 16 kb/s channels using ADPCM techniques.

The present invention also encompasses an ATM cell mapping for supporting the delivery of telephony services in a digital subscriber loop architecture which is based on a digital telephony signal payload, a signaling payload, and an overhead payload. The digital telephony payload is used to transport the telephony services, the signaling payload is used to transport signaling for generation of ringing, dial-tone, and other standard telephony functions, and the overhead payload transports control and maintenance messages.

Another feature of the present invention is that it supports echo cancellation which can be used in conjunction with ADPCM techniques to guarantee an acceptable voice quality.

An advantage of the present invention is that the service provider can deliver multiple voice circuits in addition to a high-speed data service over one twisted wire pair, and can provide the customer with traditional telephony services connected via the PSTN. In addition, the service provider can continue to provide the primary phone line as an analog service compatible with the data service, and offer one or more additional phone lines. Depending on the quality of service desired, these phone lines can use compression, and up to four additional phone lines can be supported in the residence or business, along with the data service.

These and other features and objects of the invention will be more fully understood from the following detailed description of the preferred embodiments which should be read in light of the accompanying drawings.

BRIEF DESCRIPTION OF THE DRAWINGS

The accompanying drawings, which are incorporated in and form a part of the specification, illustrate the embodiments of the present invention and, together with the description serve to explain the principles of the invention.

In the drawings:

FIG. 13A illustrates the downstream ATM cell format for cells from the BDT to the BNU or USAM;

FIG. 13B illustrates the downstream ATM cell format for cells from the BDT to the BNU or USAM;

DETAILED DESCRIPTION OF THE PREFERRED EMBODIMENT

Figure 1:
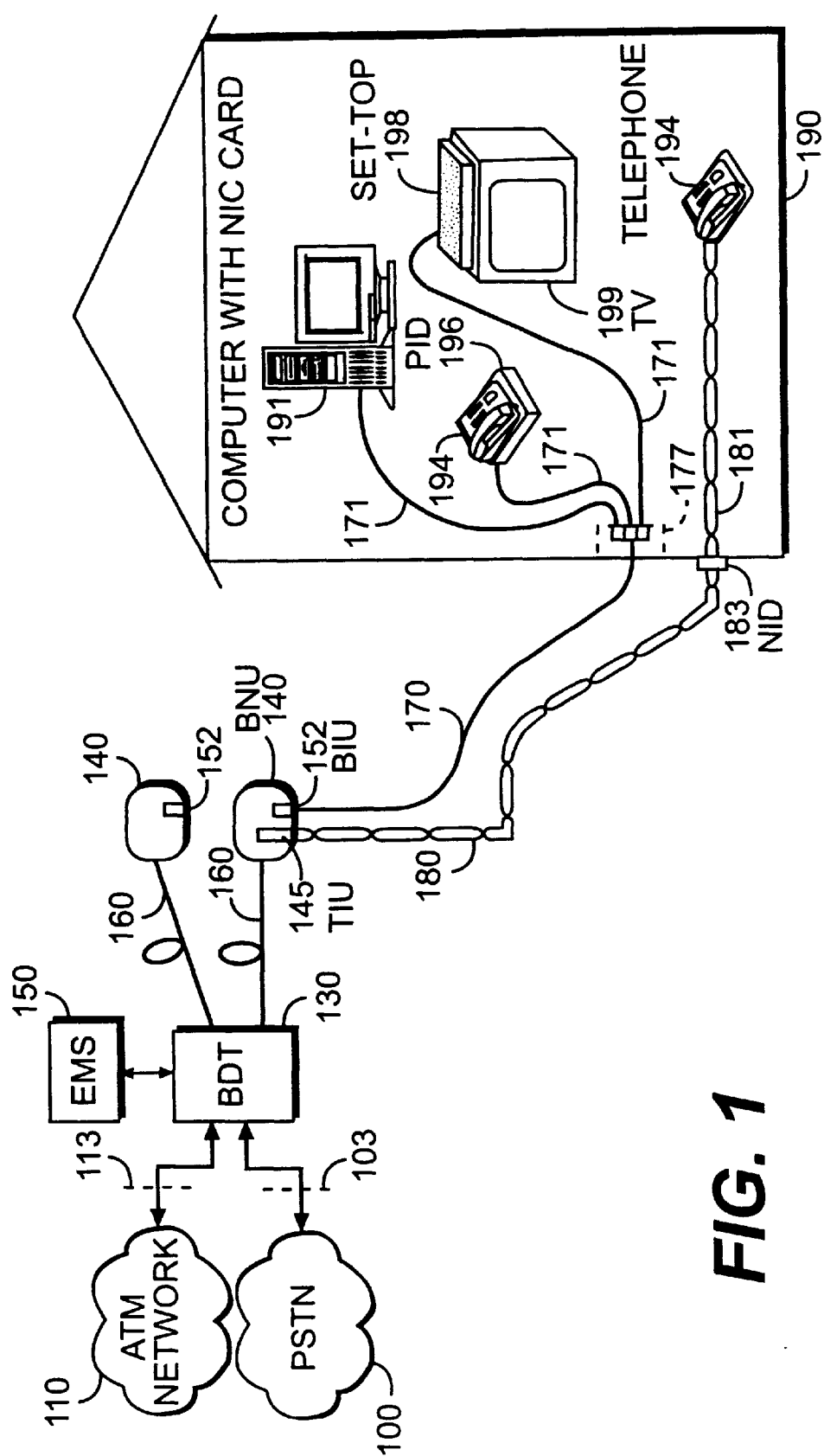
FIG. 1 illustrates a fiber-to-the-curb access system with coaxial drop cables.

In describing a preferred embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

In describing a preferred embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

With reference to the drawings, in general, and FIGS. 1 through 15 in particular, the apparatus of the present invention is disclosed.

FIG. 1 illustrates a Fiber-to-the-Curb (FTTC) network in which various devices in the residence 190 are connected to the Public Switched Telecommunications Network (PSTN) 100 or Asynchronous Transfer Mode (ATM) network 110. The devices in the residence 190 can include telephone 194, television (TV) 199 with a television set-top 198, computer with Network Interface Card (NIC) 191, and Premises Interface Device (PID)196 connected to a telephone 194.

The FTTC network illustrated in FIG. 1 works by connecting a Broadband Digital Terminal 130 to the PSTN 100 and ATM network 110. The PSTN-BDT interface 103 is specified by standards bodies, and in the US are specified By Bellcore specifications TR-TSY-000008, TR-NWT-000057 or GR-NWT-000303. The BDT 130 can also receive special services signals from private or non-switched public networks. The physical interface to the PSTN is twisted wire pairs carrying DS-1 signals, or optical fibers carrying OC-3 optical signals.

The interface to the ATM network-BDT interface 113 can be realized using an OC-3 or OC-12c optical interfaces carrying ATM cells. In a preferred embodiment, BDT 130 has two OC-12c broadcast ports, which receive signals carrying ATM cells, and one OC-12c interactive port which receives and transmits signals.

An element management system (EMS)150 is connected to BDT 130 and forms part of the Element Management Layer (EML) which is used to provision services and equipment on the FTTC network, in the central office where the BDT 130 is located, in the field, or in the residences. The EMS 150 is software based and can be run on a personal computer in which case it will support one BDT 130 and the associated access network equipment connected to it, or can be run on a workstation to support multiple BDTs and access networks.

Broadband Network Units (BNUs) 140 are located in the serving area and are connected to BDT 130 via optical fiber 160. Digital signals in a format which is similar to the Synchronous Digital Hierarchy (SDH) format are transmitted to and from each BNU 140 over optical fiber 160 at a rate of 155 Mb/s. In a preferred embodiment optical fiber 160 is a single-mode fiber and a dual wavelength transmission scheme is used to communicate between BNU 140 and BDT 130. In an alternate embodiment a single wavelength scheme is used in which low reflectivity components are used to permit transmission and reception on one fiber.

A Telephony Interface Unit (TIU) 145 in BNU 140 generates an analog Plain Old Telephony (POTS) signal which is transported to the residence 190 via a twisted wire pair drop cable 180. At the residence 190 a Network Interface Device (NID) 183 provides for high-voltage protection and serves as the interface and demarcation point between the twisted wire pair drop cable 180 and the inside twisted wire pairs 181. In a preferred embodiment TIU 145 generates POTs signals for six residences 190, each having a separate twisted wire pair drop cable 180 connected to BNU 140.

As shown in FIG. 1, a Broadband Interface Unit (BIU) 152 is located in BNU 140 and generates broadband signals which contain video, data and voice information. BIU 152 modulates data onto an RF carrier and transmits the data over a coaxial drop cable 170 to a splitter 177, and over inside coaxial wiring 171 to the devices in the residence 190.

In a preferred embodiment 64 BNUs 140 are served by an BDT 130. Each BNU serves 8 residences 190. In an alternate embodiment, each BNU 140 serves 16 residences 190.

As shown in FIG. 1, each device connected to the inside coaxial wiring 171 will require an interface sub-system which provides for the conversion of the signal from the format on the inside coaxial wiring 171 to the service interface required by the terminal equipment, which can be a telephone 194, television 199, computer, or other device. In a preferred embodiment, the PID 196 extracts time division multiplexed information carried on the inside coaxial wiring 171 and generates a telephone signal compatible with telephone 194. Similarly, the television set-top 198 converts digital video signals to analog signals compatible with TV 199. The NIC card generates a computer compatible signal.

In the system illustrated in FIG. 1, a Network Interface Device (NID) 183 is located on the side of residence 190 at what is known in the industry as the network demarcation point. For the delivery of telephony services NID 183 is a passive device whose principal functions are lightning protection and the ability to troubleshoot the network by allowing connection of a telephone 194 to the twisted wire pair drop cable 180 to determine if wiring problems exist on the inside twisted wire pairs 181.

Figure 2:
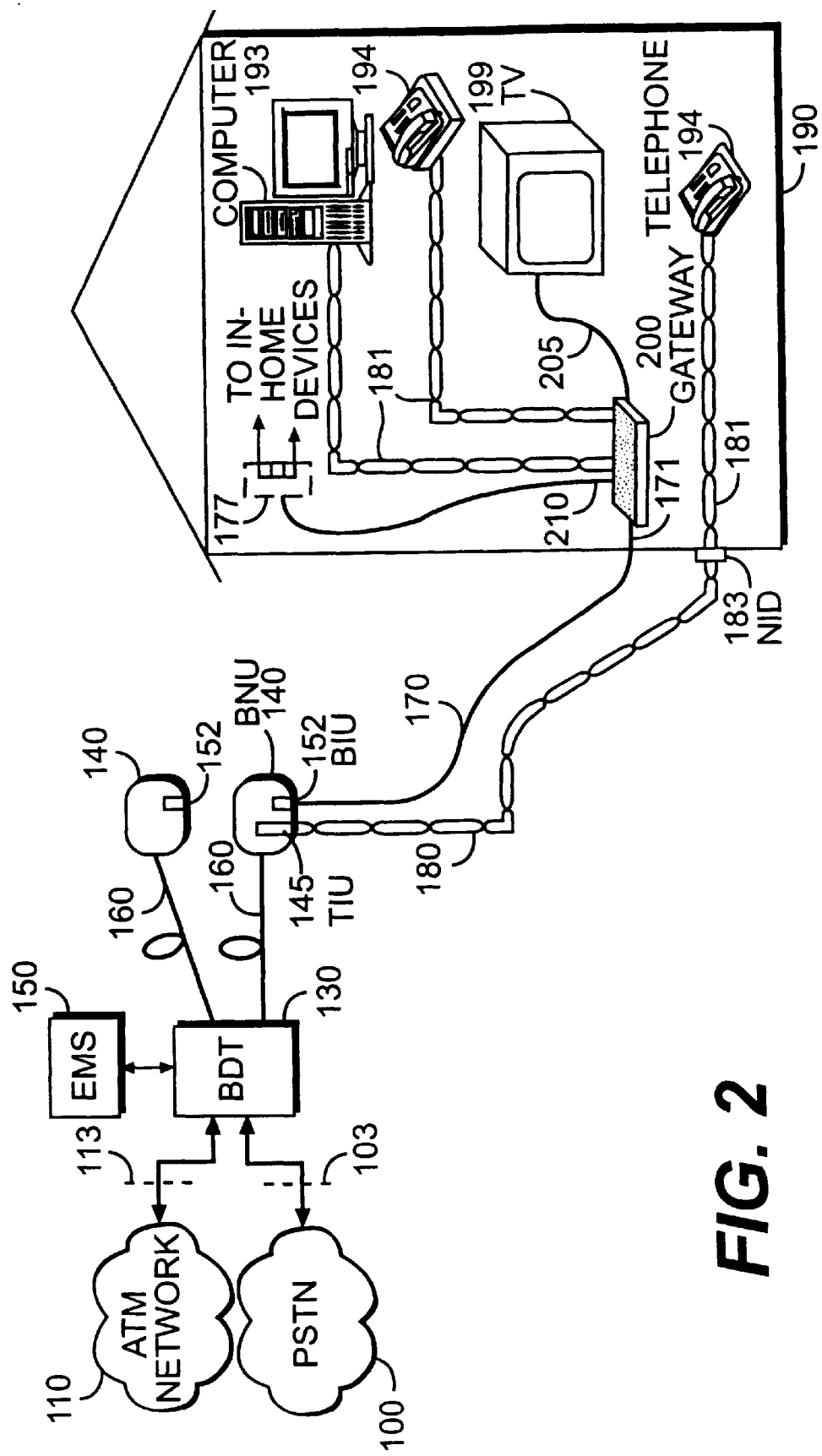
FIG. 2 illustrates a fiber-to-the-curb access system with a gateway used in the residence for the distribution of video, data and telephony signals.

FIG. 2 illustrates the use of a gateway 200 to generate signals compatible with the devices in the home, which are connected to the gateway 200 via inside twisted wire pairs 181 or inside coaxial cable wiring and a splitter 177. The connection to the splitter is made using a gateway-splitter connection 210, which in a preferred embodiment is coaxial cable. A direct connection to a television can be made using a gateway-television connection 205, which in a preferred embodiment is a four conductor cable carrying an S-video signal.

The use of a gateway 200 can reduce the number of devices required in the residence 190 to interface between the access network and the terminal equipment including television 199, telephone 194, and computer 193.

Figure 3:
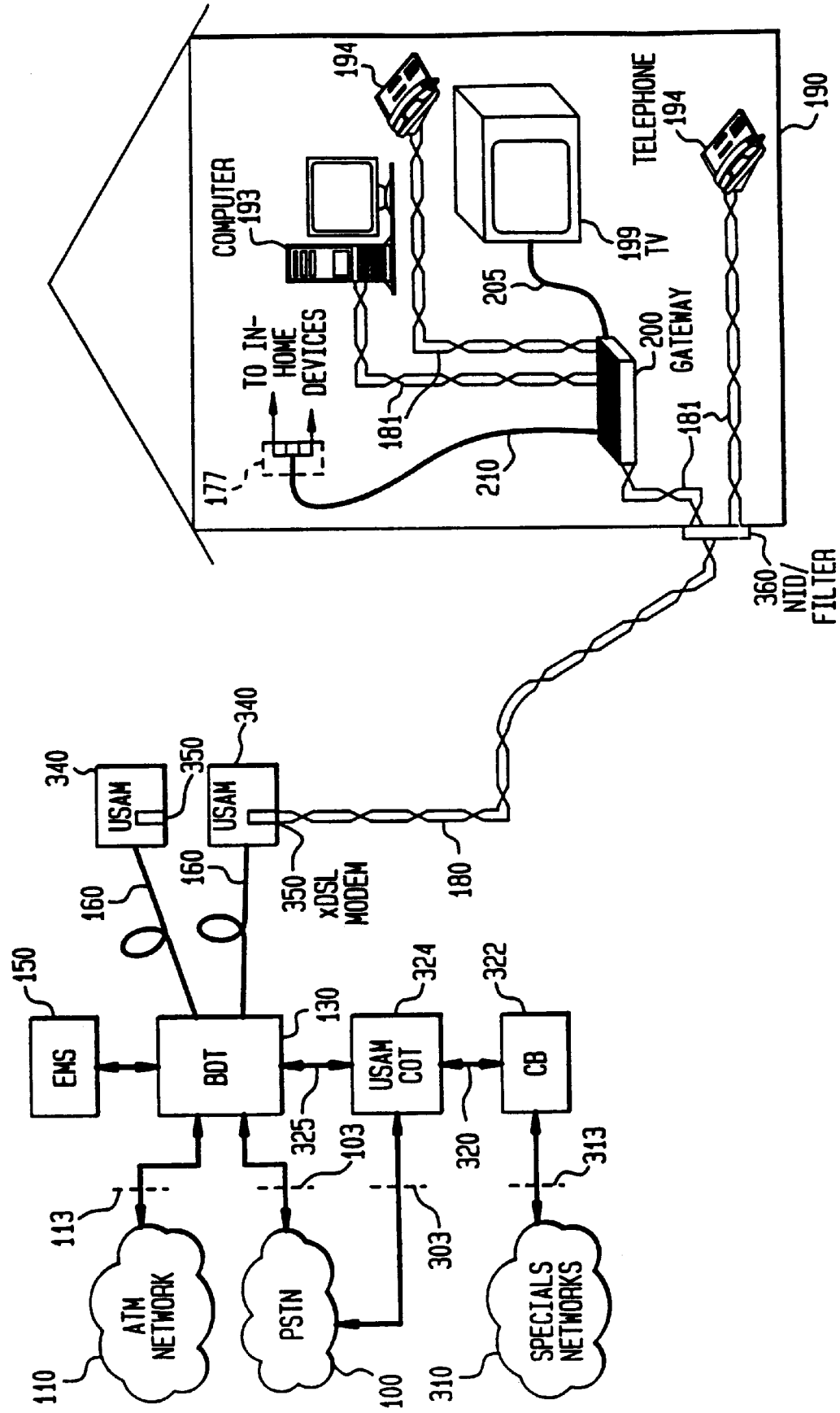
FIG. 3 illustrates a fiber-to-the-curb access system with twisted wire pair drop cable to a residence having a gateway.

FIG. 3 illustrates a FTTC network which relies on twisted wire pair drop cables 180 instead of coaxial drop cables 170. This embodiment is preferable when it is cost prohibitive to install coaxial drop cables from BNUs 140 to residences 190.

As shown in FIG. 3, a Universal Service Access Multiplexor (USAM) 340 is located in the serving area, and is connected to BDT 130 via optical fiber 160. An xDSL modem 350 provides for the transmission of high-speed digital data over the twisted wire pair drop cable 180 to and from residence 190. When used herein, the term xDSL efers to any one of the twisted wire pair digital subscriber loop transmission techniques including High Speed Digital Subscriber Loop, Asymmetric Digital Subscriber Loop, Very high speed Digital Subscriber Loop, Rate Adaptive Digital Subscriber Loop, or other similar twisted wire pair transmission techniques. Such transmission techniques are know to those skilled in the art. The xDSL modem 350 contains the circuitry and software to generate a signal which can be transmitted over the twisted wire pair drop cable 180, and which can receive high speed digital signals transmitted from gateway 200 or other devices connected to the subscriber network.

Traditional analog telephone signals are combined with the digital signals for transmission to the residence 190 and a NID/filter 360 is used to separate the analog telephone signal from the digital signals. The majority of xDSL transmission techniques leave the analog voice portion of the spectrum (from approximately 400 Hz to 4,000 Hz) undisturbed. The analog telephone signal, once separated from any digital data signals in the spectrum, is sent to telephone 194 over the inside twisted wire pairs 181.

The digital signals which are separated at the NID/filter 360 are sent from a separate port on the NID/filter 360 to the gateway 200. The gateway serves as the interface to the devices in the residence 190 including the television 199, the computer 193, and additional telephone 194.

The central office configuration illustrated in FIG. 3 includes a Universal Service Access Multiplexor Central Office Terminal (USAM COT) 324 connected to BDT 130 via a USAM COT-BDT connection 325, which in a preferred embodiment is an STS3c signal transmitted over a twisted wire pair. The PSTN-USAM COT interface 303 is one of the Bellcore specified interfaces including TR-TSY-000008, NWT-000057 or TR-NWT-000303. The USAM COT 324 has the same mechanical configuration as the USAM in terms of power supplies and common control cards, but has line cards which support twisted wire pair interfaces to the PSTN (including DS-1 interfaces) and cards which support STS3c transmission over twisted wire pair for the USAM COT-BDT connection 325.

A Channel Bank (CB) 322 is also used in the central office to connect specials networks 310, comprised of signals from special private or public networks, to the access system via the specials networks-CB interface 313. In a preferred embodiment, the CB-USAM COT connection 320 are DS1 signals over twisted wire pairs.

When used herein the term subscriber network refers in general to the connection between the BNU 140 and the devices or gateway 200 in the residence 190 or the connection between USAM 340 and the devices or the gateway in the residence 190. The subscriber network may be comprised of coaxial cable and a splitter, twisted wire pairs, or any combination thereof.

Although FIG. 2 and FIG. 3 illustrate the gateway 200 located inside the living area of residence 190, the gateway can be located in the basement, in the garage, in a wiring closet, on an outside wall of the residence 190, in the attic, or in any of the living spaces. For outside locations gateway 200 will require a hardened enclosure and components which work over a larger temperature range than those used for a gateway located inside the residence 190. Techniques for developing hardened enclosures and selecting temperature tolerant components are known to those skilled in the art.

Figure 4:
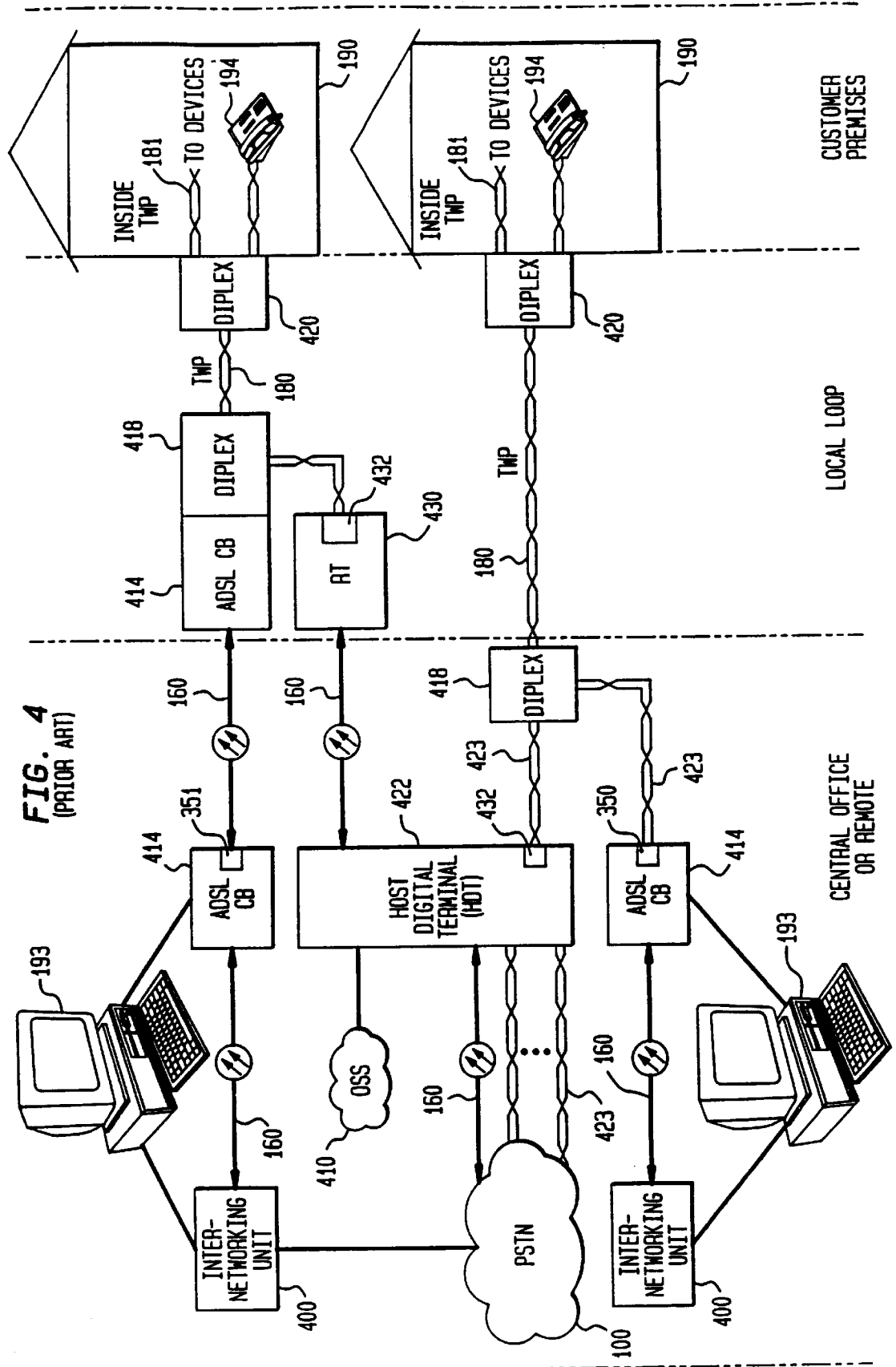
FIG. 4 illustrates the prior art which has been used for the delivery of analog telephone signals in conjunction with high speed data signals.

FIG. 4 illustrates system architectures which have been used to provide high speed data services over existing twisted wire pair networks. In these systems a Host Digital Terminal (HDT) 422 is connected to the PSTN 100 via twisted wire pairs 423 or optical fiber 160. A Remote Terminal (RT) 430 is connected to the HDT 422 via one or more optical fibers 160. An analog POTs linecard 432 is located in RT 430 and can provide analog telephone services over distances up to approximately 12,000 ft.

As shown in FIG. 4, an analog POTs linecard 432 can be located directly in HDT 422 to provide analog telephone service to residences which are within 12,000 ft. of the telephone central office or remote structure.

The architecture illustrated in FIG. 4 is based on the provisioning of telephone service to subscribers. The Operational and Support Systems (OSS) 410 connected to HDT 422 support basic and advanced telephone services, but does not support advanced high speed data services.

For the additional high speed data services, the traditional approach has been to utilize overlay equipment to provide those services. FIG. 4. illustrates the use of ADSL Channel Banks (ADSL CBs) 414 which are added to the network to provide high speed data services. An ADSL CB 414 with an xDSL modem 350 can be added at the central office, and routes data signals into an Inter-Networking Unit (INU) 400 which takes data signals which are typically in the form of Internet Protocol (IP) packets and adapts them for transmission on the PSTN 100 in a PSTN compatible format such as frame relay, or switched multimegabit data service, or switched 56 data service. Because the OSS 410 does not support high speed data services, a separate computer 193 is used to configure the INU 400 and provision data services.

Referring to the upper portion of FIG. 4, a fiber optic transceiver 351 can be used in ADSL CB 414 to transmit high speed data signals over an optical fiber 160 to an ADSL CB 414 located in the local loop, remote from the central office. The ADSL CB 414 in the local loop can be located near the RT 430, an a line side diplex filter 418 is used to combine the analog telephony signal with the high speed data signal. The combined signals are transmitted over twisted wire pair drop cable 180 to a subscriber side diplex filter 420 which separates the high speed data signal from the analog telephony signal.

The lower portion of FIG. 4 illustrates how high speed data can be transmitted from an ADSL CB in the telephone central office or remote office to a subscriber. The high speed data signals generated on xDSL modem 350 are transmitted over twisted wire pair 423 to a line side diplex filter 418 which combines the high speed data signal with the analog telephony signal generated on the analog POTs linecard 432. The combined signals are transmitted over twisted wire pair drop cable 180, and are received at the residence 190, where a subscriber side diplex filter 420 separate the high speed data signal from the analog telephony signal. The high speed data signals are transmitted over the inside twisted wire pairs 181 to devices in the residence, while the analog telephony signal is transmitted to telephone 194.

Figure 5:
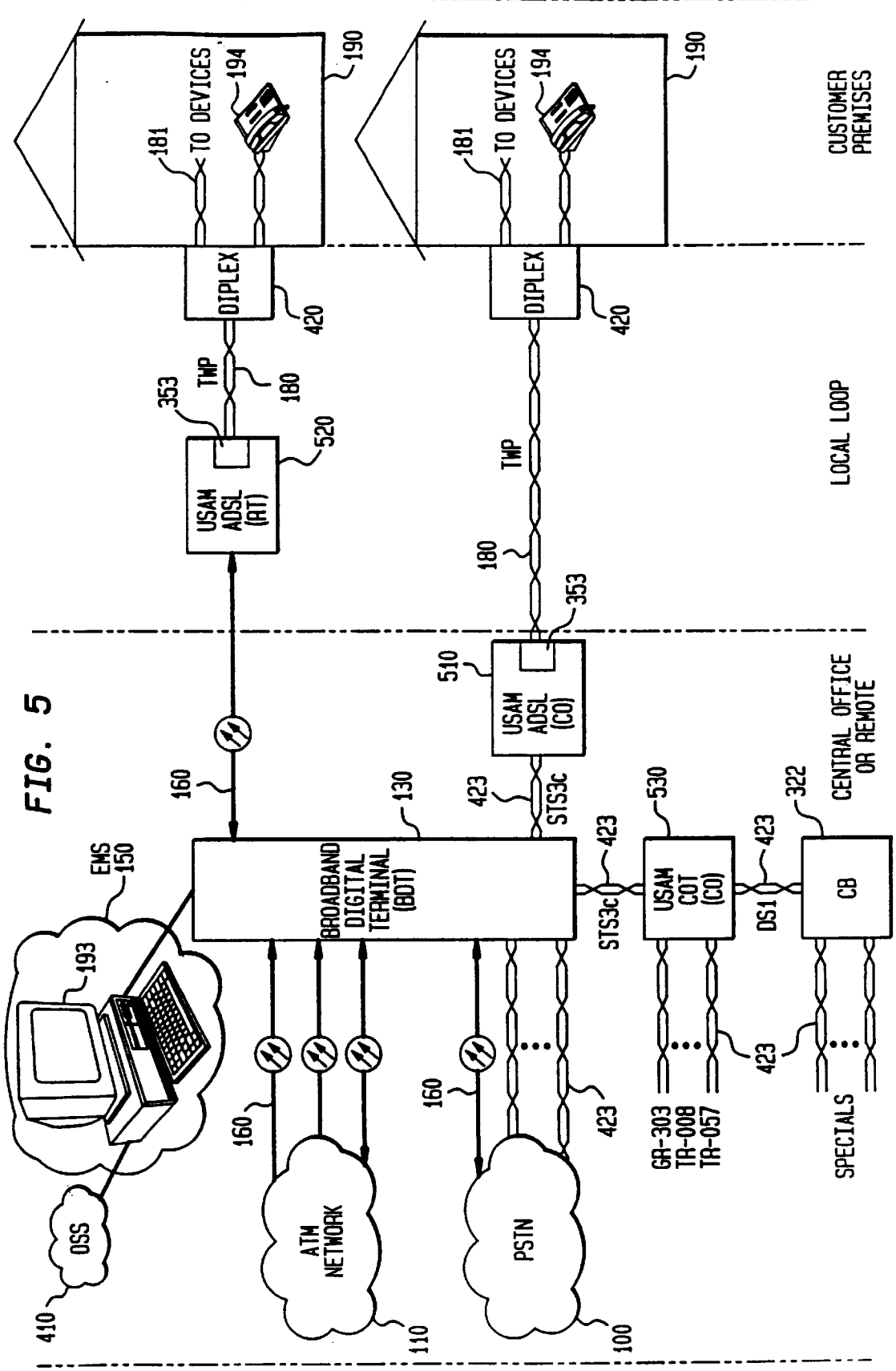
FIG. 5 illustrates a system in which the Universal Service Access Multiplexor is used with Asymmetric Digital Subscriber Loop (ADSL) transmission techniques to provide analog telephone and high speed data services.

FIG. 5 illustrates one embodiment of the present invention for providing both high speed data and voice services from a single access network platform. In this architecture, a BDT 130 is connected to an ATM network 110 via optical fibers 160 using the ATM network-BDT interfaces 113, and simultaneously to the PSTN 100 via optical fibers 160 and twisted wire pairs 423 using the PSTN-BDT interfaces 103 previously described. ATM/TDM description. An EMS 150 which consists of a computer 193 and specialized EML software allows for the provisioning of traditional telephone as well as new services. OSS 410 supports the provisioning of traditional telephone services, and as the OSS 410 is updated, EMS 150 allows for new services to be provisioned from the OSS 410 using flow-through provisioning.

At the central office side of the network in FIG. 5, a USAM COT in the Central Office (USAM COT-CO) 530 can be used to interface telephony signals from TR-TSY-000008, TR-NWT-000057 or GR-NWT-000303 interfaces provided by a public or private network to the BDT 130. This is accomplished by receiving the signals in the TR-008, TR-057, and GR-303 formats transmitted over twisted wire pairs 423 at USAM COT-CO 530, grooming and mulitplexing those signals as required, and transmitting them to BDT 130 over twisted wire pairs 423 using a STS3c format. In this way the BDT can be used to handle signals from additional networks.

Additionally, signals from other telecommunications services networks, typically referred to as "specials," can be routed to the BDT 130 through the use of a Channel Bank 322 which receives "specials" on twisted wire pairs 423, multiplexes and grooms the signals, and transmits them on to USAM COT-CO over twisted wire pairs 423. The USAM COT-CO can perform additional grooming and multiplexing as required, and transmit the signals to BDT 130.

Referring to the upper portion of FIG. 5, an optical signal in an SDH type format at 155 Mb/s can be transmitted via optical fiber 160 to USAM ADSL in a Remote Terminal configuration (USAM ADSL-RT) 520. A telephony/xDSL linecard 353 contained within the USAM ADSL-RT 520 is used to generate both an xDSL signal as well as an analog telephony signal. In the case of the system shown in FIG. 5, the telephony/xDSL linecard 353 generates an ADSL signal in addition to the analog telephony signal. The architecture for the telephony/xDSL linecard 353 is described later in this specification and is illustrated in FIGS. 11A–12B.

In the case of the USAM ADSL-RT 520 the combined telephony and high speed data signals are transmitted over the twisted wire pair drop cable 180 to a subscriber side diplex filter 420, which separates the high speed data signal from the analog telephony signal. The high speed data signals are transmitted over the inside twisted wire pairs 181 to devices in the residence, while the analog telephony signal is transmitted to telephone 194.

The lower portion of FIG. 5 illustrates the use of a USAM ADSL in a Central Office configuration (USAM ADSL-CO) 510. In this instance, high speed data and digitized telephony signals are transmitted from BDT 130 to USAM ADSL-CO 510 over twisted wire pairs 423. The USAM-ADSL-CO contains a telephony/xDSL linecard 353 which generates both an xDSL signal as well as an analog telephony signal. These signals are transmitted to residence 190, where a subscriber side diplex filter 420 separates the high speed data signal from the analog telephony signal. The high speed data signals are transmitted over the inside twisted wire pairs 181 to devices in the residence, while the analog telephony signal is transmitted to telephone 194.

Figure 6:
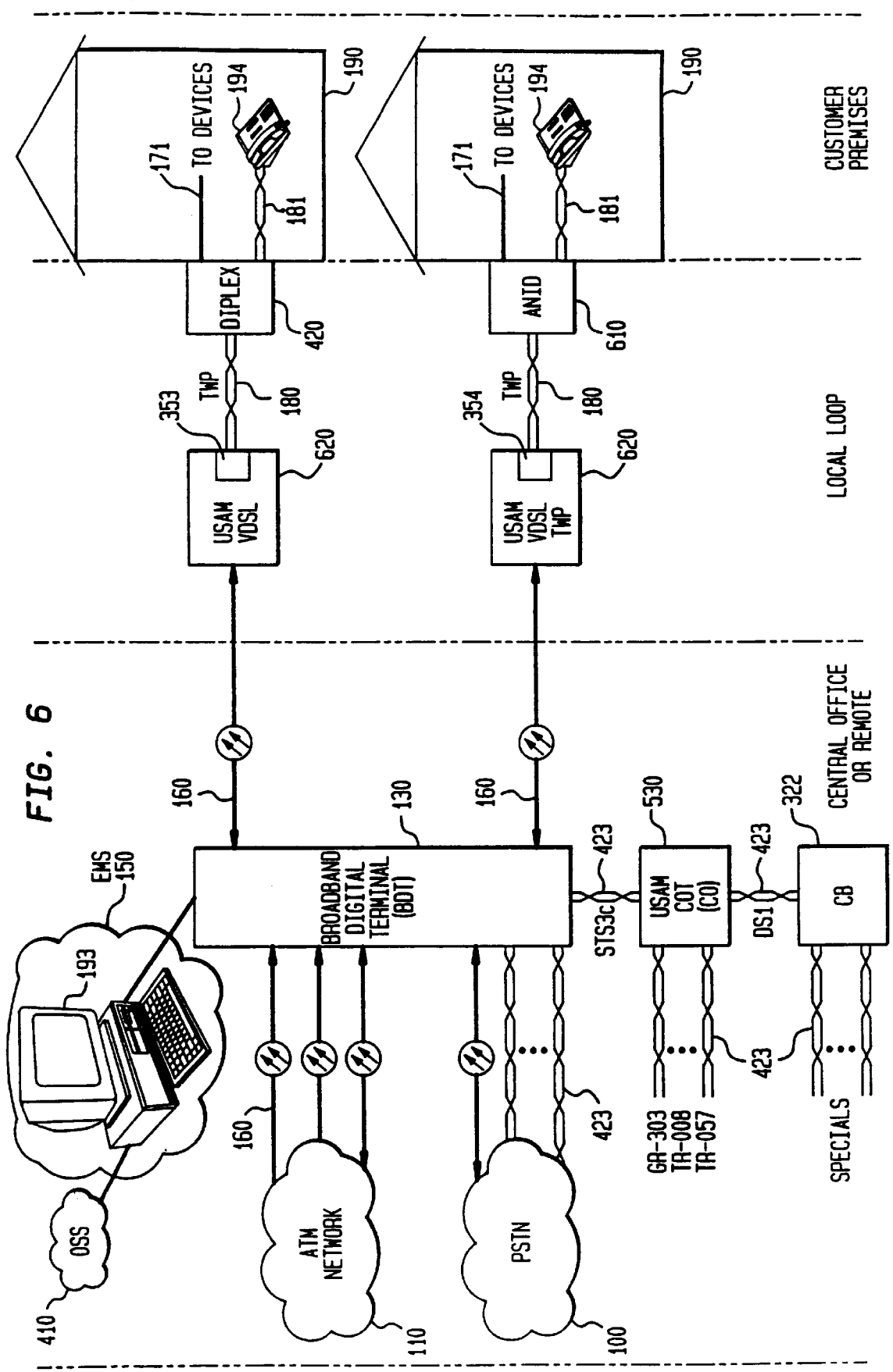
FIG. 6 illustrates a system in which the Universal Service Access Multiplexor is used with Very high speed Digital Subscriber Loop (VDSL) transmission techniques to provide analog telephone and high speed data services.

FIG. 6 illustrates an alternate embodiment, in which a USAM VDSL 620 is used to provide both the telephony and data signals. In this configuration a telephony/xDSL linecard 353 is used to generate both telephony and high speed data signals, but the high speed data signals are in a Very high speed Digital Subscriber Loop (VDSL)format as opposed to an Asymmetric Digital Subscriber Loop (ADSL) format. The principal distinction between ADSL and VDSL is that VDSL transmission supports data rates up to approximately 26 Mb/s downstream to the residence 190, and 5 Mb/s upstream from the residence 190 over distances not exceeding 3,000 ft., while ADSL supports data rates of up to 9 Mb/s downstream, and up to 640 kb/s upstream over distances of up to 9,000 ft. Using ADSL transmission techniques it is possible to span distances up to 12,000 ft. with some reduction in the data rate.

In the upper part of FIG. 6 a system is illustrated in which signals are transmitted from a telephony/xDSL linecard 353 in USAM 620 over a twisted wire pair drop cable 180 to the subscriber side diplex filter 420 which separates the telephony and high speed data signals. In the embodiment illustrated, the analog telephony signals are transmitted from the subscriber side diplex filter 420 over inside twisted wire pairs 181 to telephone 194. Data signals are transmitted over inside coaxial wiring 171 to devices in residence 190.

The lower portion of FIG. 6 illustrates an alternate embodiment in which digital signals are transmitted from a VDSL modem 354 in USAM VDSL 620 over a twisted wire pair drop cable 180 and are received at an Active Network Interface Device (ANID) 610 which generates an analog telephony signal for transmission over inside twisted wire pairs 181 to a telephone 194. The VDSL modem 354 and ANID 610 architecture which can provide this functionality are described in greater detail in FIGS. 11A and 11B along with the corresponding text.

Figure 7:
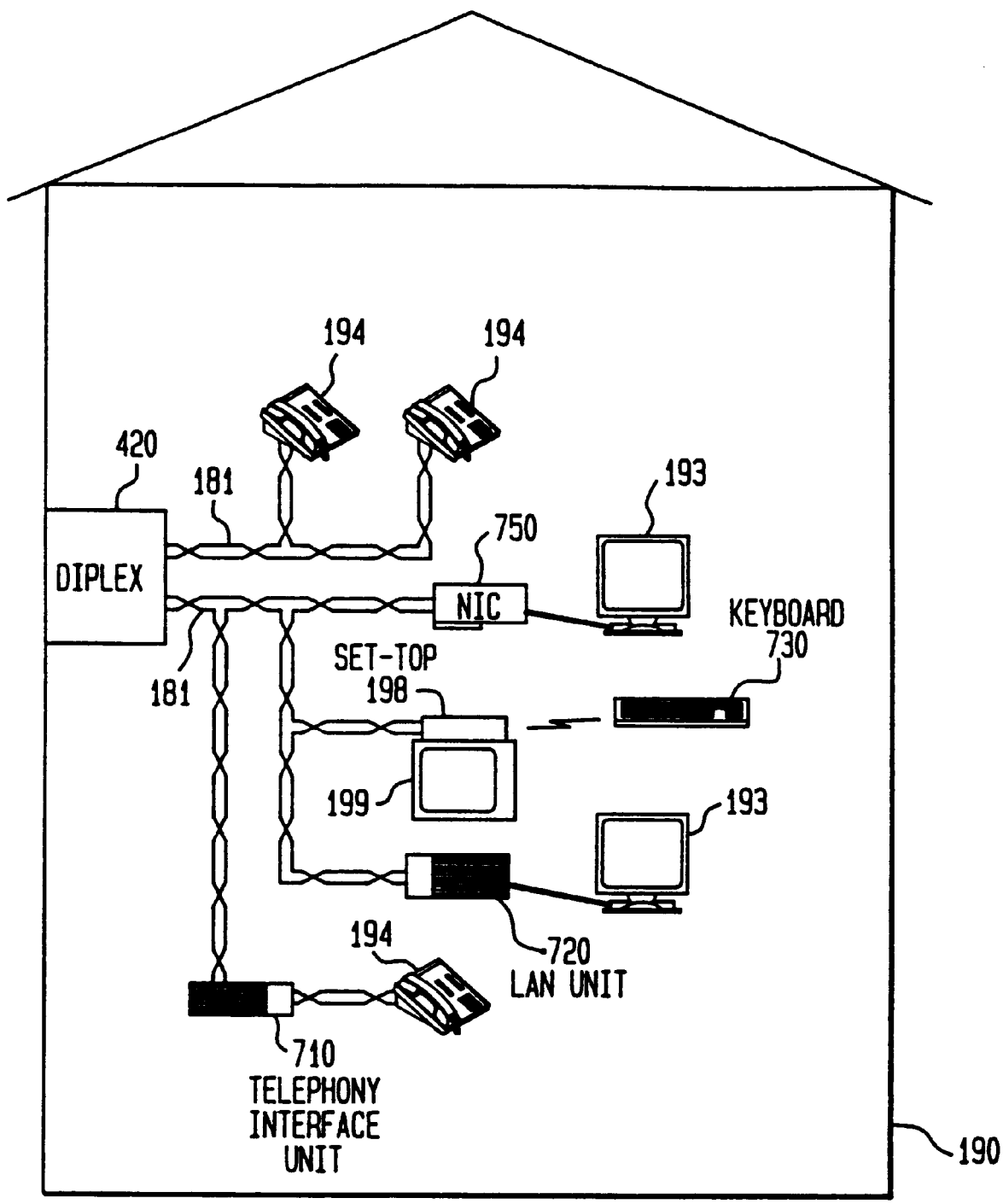
FIG. 7 illustrates the use of twisted wire pair for the distribution of high speed data services in the residence.

FIG. 7 illustrates an embodiment in which signals are received at residence 190 by a subscriber side diplex filter 420 which separates the analog telephony signal from the digital xDSL signal using filter techniques well understood by those skilled in the art. From the subscriber side diplex filter 420 the analog telephony signals are sent over a point-to-multipoint in-home network based on inside twisted wire pairs 181 and are received by telephones 194. In this embodiment, the digital high speed data signal is routed over a point-to-multipoint in-home network based on inside twisted wire pairs 181 to a variety of devices including a telephony interface unit 710, a Local Area Network (LAN) unit 720, a television set-top 198, and a Network Interface Card (NIC) 750. The residential telephony interface unit 710 serves to separate the Time Division Multiplexed (TDM) data which contains telephony signals from the digital data stream on twisted wire pair 181, and generate an analog telephony signal compatible with telephone 194. Television set-top 198 extracts the ATM cells containing video and set-top specific data and presents that information on TV 199. A remote keyboard 730 can be used with television set-top 198 to provide computer-type functionality. LAN unit 720 extracts ATM cells which have the address of the LAN unit 720 and permit the computer 193 connected to the LAN unit 720 to be connected to the Internet or other intranets. Similarly, NIC card 750 interfaces computer 193 to external networks.

Figure 8:
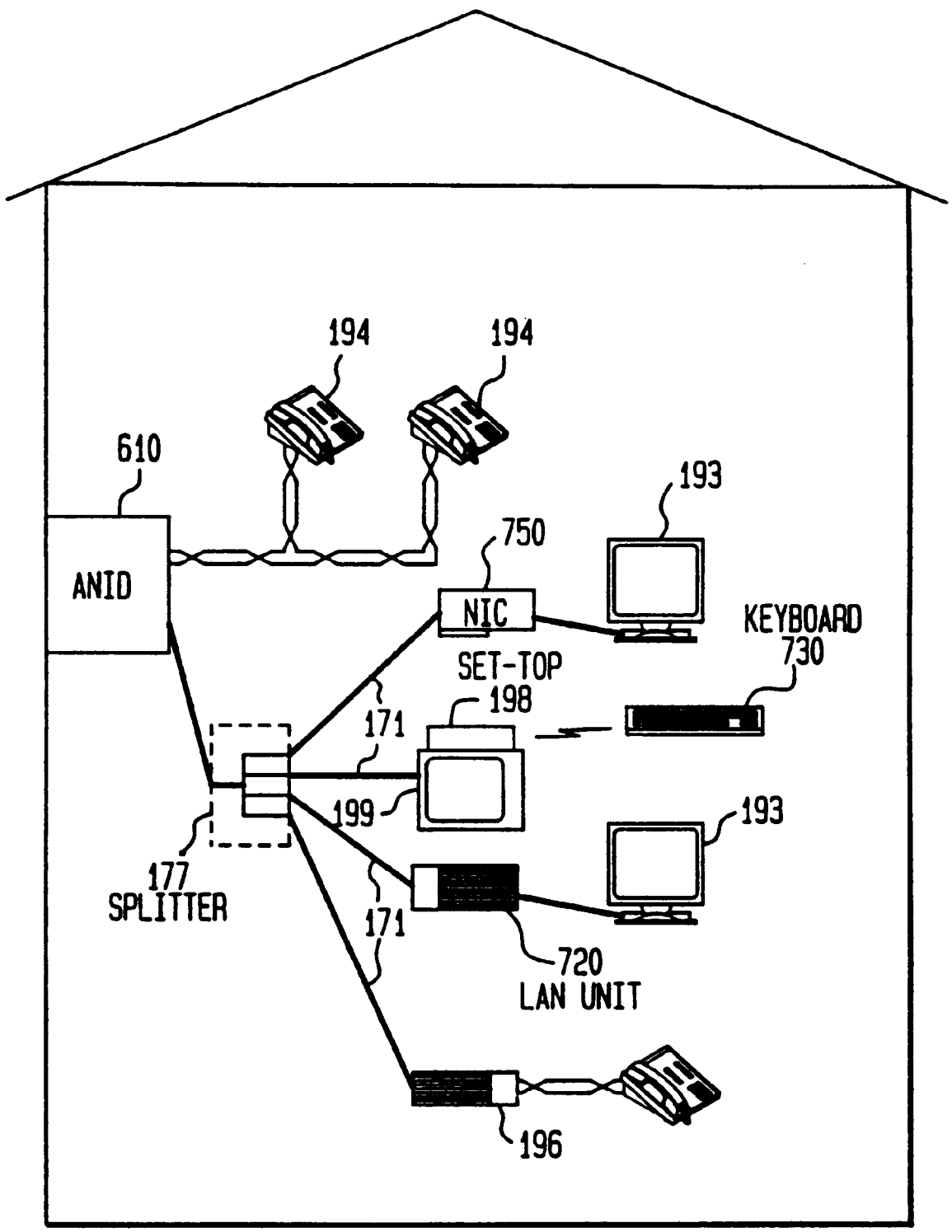
FIG. 8 illustrates the use of coaxial wiring and an active network interface device for the distribution of high speed data services in the residence.

FIG. 8 illustrates an embodiment in which an ANID 610 receives the high speed digital data from a twisted wire pair drop cable 180, and generates a coaxial cable compatible signal which is transmitted over inside coaxial wiring 171 to a splitter 177. Splitter 177 is of the type commonly used in homes today for the distribution of cable TV signals. The signals are routed from the splitter 177 over inside coaxial wiring 171 to a variety of devices including a Premises Interface Device (PID) 196, a Local Area Network (LAN) unit 720, a television set-top 198, and a Network Interface Card (NIC) 750.

Figure 9:
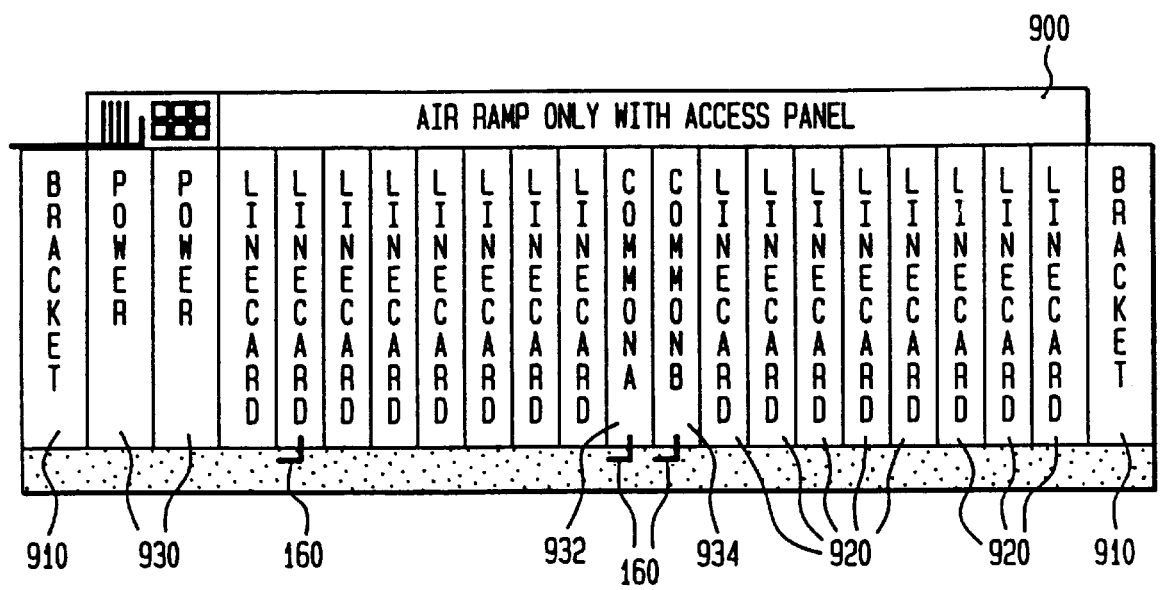
FIG. 9 illustrates the mechanical configuration of the USAM.

FIG. 9 illustrates the mechanical configuration of the Universal Service Access Multiplexor (USAM) 340. The USAM 340 can be rack mounted using brackets 910, and has redundant USAM power supply plug-ins 930. An air ramp 900 is used to provide cooling. There are two common control cards, Common Control A 932 and Common Control B 934, which interface to BDT 130 via optical fiber 160. In a preferred embodiment the bi-directional optical signals sent on optical fiber 160 are in an SDH like format, at a rate of 155 Mb/s.

USAM linecard plug-in units 920 are used to provide telecommunications services to subscribers. These linecards interface to twisted wire pair drop cables 180. In addition to linecards which interface to twisted wire pair drop cables 180 it is possible to have USAM linecard plug-in units 920 have fiber optic interfaces and which support optical transmission over fiber optic cable 160. There are four general categories of linecard plug-in units 920, including narrowband linecards, broadband linecards, VDSL linecards, and ADSL linecards.

The narrowband linecards support legacy telephony services including POTs, coin phone services, T1 services, ISDN services, and all of the existing special telecommunications services.

Broadband linecards support Asynchronous Transfer Mode Universal Network Interfaces (UNIs). These UNI based broadband cards use an appropriate physical media which may be twisted wire pair, coaxial cable, optical fiber, or wireless connections.

VDSL linecards are used to support residential broadband services over existing twisted wire pair drop cables 180 using VDSL transmission techniques, and can support transmission of traditional telephone signals either by generation of a POTs signal on the VDSL linecard and transmission with the digital VDSL signal in different portions of the spectrum, or by transmission of the telephone data in a digital form within the VDSL signal, with generation of the analog POTs signal occurring at the residence 190. In yet another embodiment, analog telephone signals can be combined with the VDSL signal in a diplexor external to the linecard.

In a preferred embodiment the VDSL transmission technique used is based on Quadrature Amplitude Modulation (QAM) transmission techniques in which data is sent in multiple levels in the I and Q channels, with the number of levels depending on the specific characteristics of the twisted wire pair drop cable 180 which is being used. For poor quality drop cables, or where there is a large amount of radio frequency ingress, a single level phase inversion scheme (in both the I and Q channels) is used which results in a Quadrature Phase Shift Keying (QPSK) transmission, which can be considered equivalent to 4-QAM. For better quality transmission channels in high quality twisted wire pair drop cables, 16-QAM or 64-QAM transmission can be used.

ADSL linecards are used to support residential broadband services using ADSL transmission techniques. ADSL transmission techniques are based upon the use of Discrete MultiTone (DMT) transmission, or QAM techniques, including the Carrierless Amplitude Modulation technique, commonly referred to as CAP, which is a method for generation of QAM signals. Analog telephone signals can be transmitted by the ADSL linecards in a manner similar to the VDSL linecards including generating the POTs signal on the ADSL linecard and combining it with the digital ADSL signal, generating the POTs signal externally and combining it with the ADSL signal, or generating the POTs signal at the residence 190.

In a preferred embodiment the USAM 340 supports 16 USAM linecard plug-ins 920. When used for VDSL and ADSL applications, there are 2 VDSL or ADSL circuits per USAM linecard plug-in 920, resulting in 32 VDSL or ADSL circuits per USAM shelf. When configured entirely with ADSL cards the USAM 340 becomes a USAM ADSL-RT 520 or USAM ADSL-CO 510 as illustrated in FIG. 5. When configured entirely with VDSL cards the USAM 340 becomes a USAM VDSL 620 as illustrated in FIG. 6. In an alternate embodiment, there are 4 circuits per VDSL or ADSL linecard.

When USAM 340 is configured for POTs services, there are 6 circuits per linecard in one embodiment, resulting in 96 circuits per USAM shelf. In another embodiment, there are 12 circuits per POTs linecard, resulting in 192 POTs circuits per shelf. The USAM illustrated in FIG. 9 represents a single shelf, but clearly it is possible to have multiple shelves for greater capacity.

In equipping USAM 340 it is also possible to mix the types of linecards to simultaneously provide ADSL, VDSL, and POTs services from the same platform. By having a cell based transport for voice and high speed data it is possible to support a variety of linecards simultaneously and to provide traditional telephone services along with high speed data services.

Figure 10:
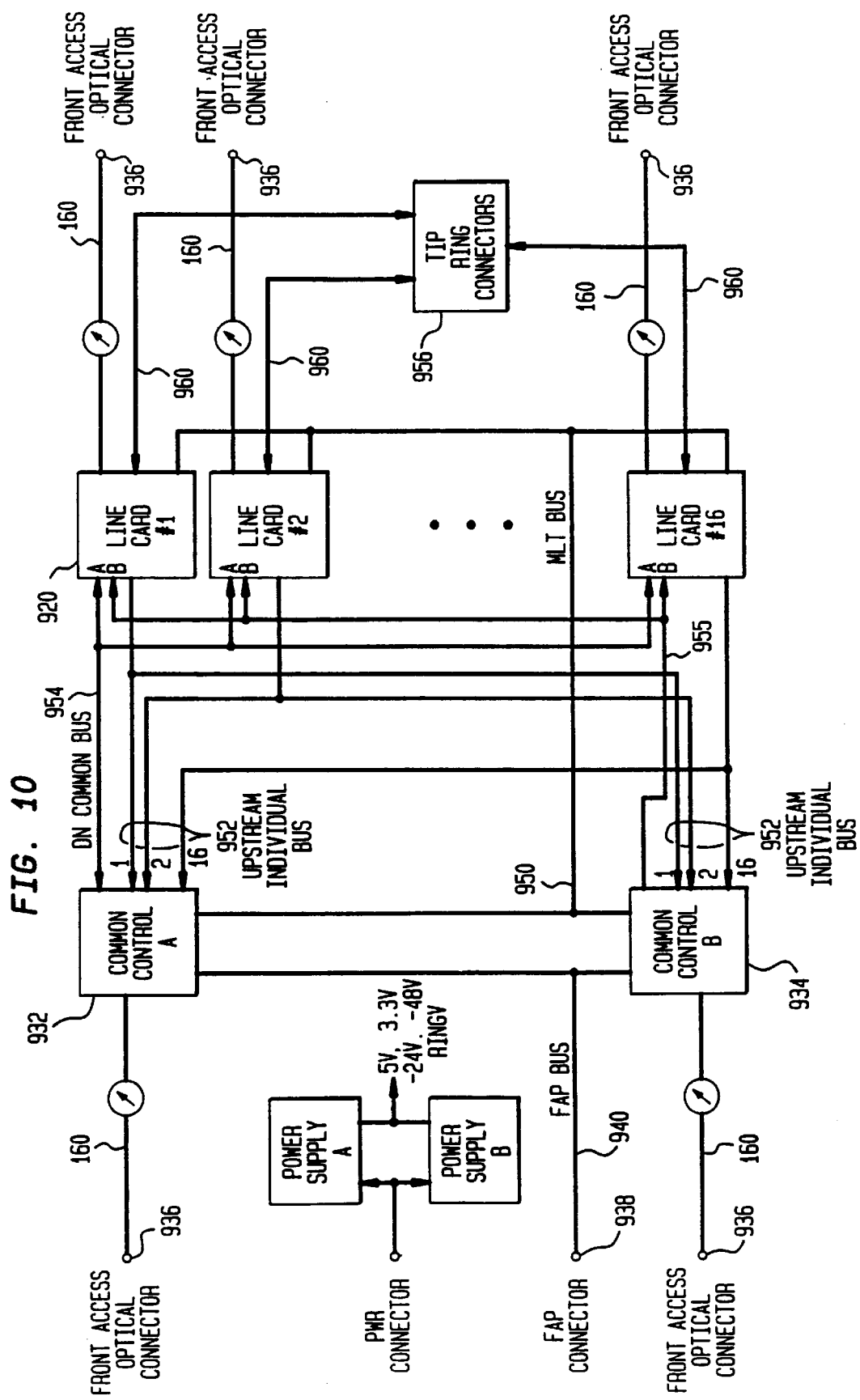
FIG. 10 illustrates the architecture of the USAM.

FIG. 10 illustrates the architecture of USAM 340, and shows how Common Control A 932, and Common Control B 934, are connected via optical fibers 160 to front access panel optical connectors 936. These connectors are connected to optical fibers 160 which are in turn connected to BDT 130. In a preferred embodiment, signals are sent from Common Control A 932 to USAM linecard plug-ins 920 via a downstream common bus A 954, and from Common Control B 934 to USAM linecard plug-ins 920 via a downstream common bus B 955. Downstream common buses A and B 954 and 955 respectively are point-to-multipoint buses, and all of the downstream payload is received at all of the USAM linecard plug-ins 920. Upstream individual buses 952 are used to transmit information from the USAM linecard plug-ins 920 to the Common Control A 932 and Common Control B 934.

A Front Access Panel (FAP) connector 938 allows connection from the front of the USAM to an internal Front Access Panel (FAP) bus 940 which can be used for diagnostics.

A Mechanized Loop Testing (MLT) bus 950 is used to allow central office equipment to simulate a direct connection to a particular twisted wire pair drop cable 180, in spite of the fact that there is actually an optical transmission system between the central office and the twisted wire pair drop cable 180. The MLT bus 950 in conjunction with circuitry on the POTs linecard allows central office equipment to determine the loop resistance and perform other key tests on a specific twisted wire pair drop cable 180.

The Tip and Ring (TR) connectors 956 serve as the point of connectivity between the USAM linecard plug-ins 920 and the twisted wire pair drop cables 180. The linecard-TR connector bus 960 provides the internal connectivity between the USAM linecard plug-ins 920 and the TR connectors 956.

USAM linecard plug-ins 920 which use optical media for transmission and reception are connected to a front access optical connector 936 via optical fiber 160, or in an alternate embodiment the front access optical connector 936 is mounted directly on USAM linecard plug-in 920.

Figure 11A:
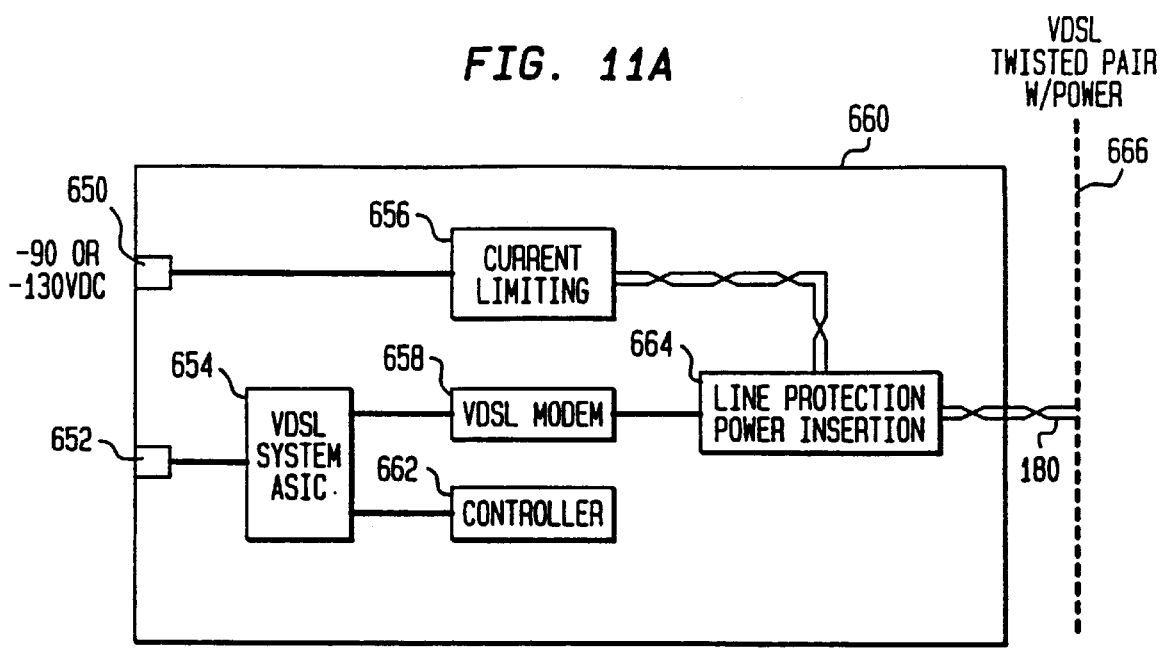
FIG. 11A illustrates the USAM linecard for xDSL applications using network powering.
Figure 11B:
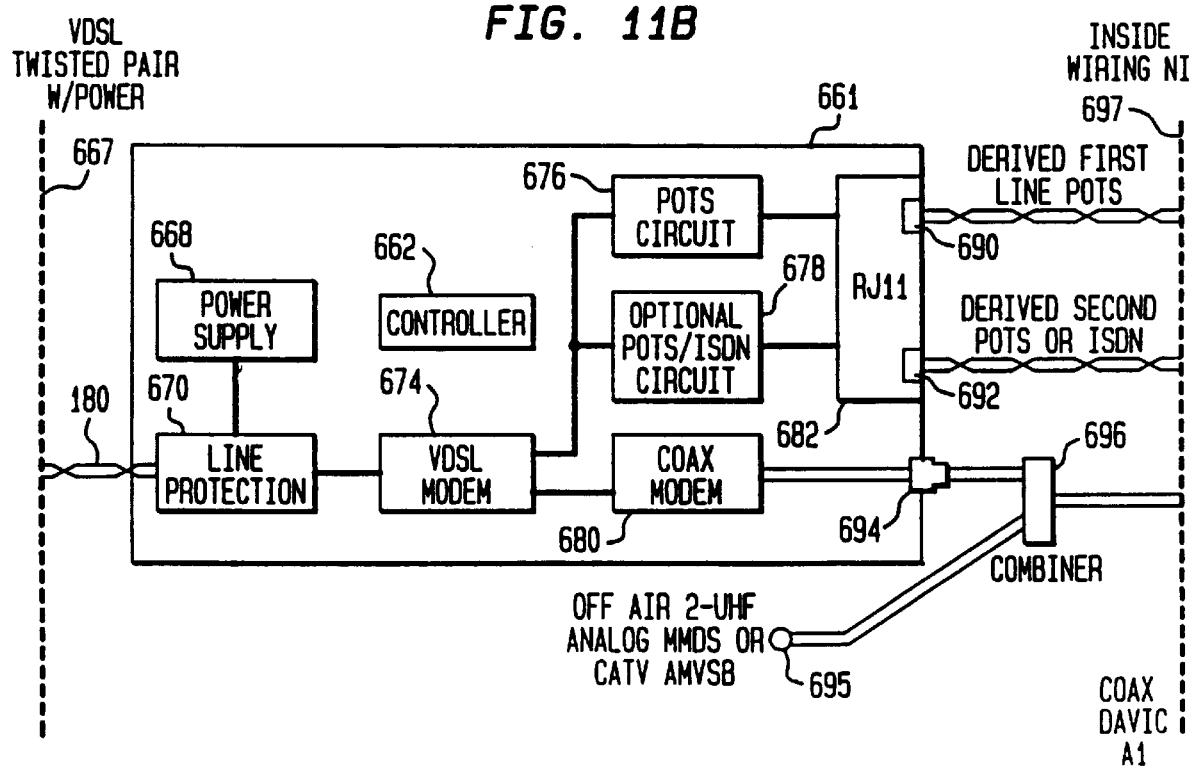
FIG. 11B illustrates the ANID for xDSL applications using network powering.

FIGS. 11A and 11B illustrate an embodiment in which VDSL signals are sent to the residence 190 from a VDSL linecard, along with a powering signal. The signal is received by a unit powered from the USAM which is capable of both deriving data for subsequent transmission in the residence 190 over inside twisted wire pairs 181, or inside coaxial wiring 171, as well as generating an analog telephony signal.

In FIG. 11A a combined digital telephony and data xDSL line side modem 660 at the USAM 340 is illustrated and consists of a VDSL system Application Specific Integrated Circuit (ASIC) 654 which is connected to a USAM backplane bus connector 652, which connects to the downstream common bus A 954, downstream common bus B 955, and upstream individual buses 952. A line side VDSL modem 658 is connected to the VDSL system ASIC 654 and generates a twisted wire pair compatible signal for transmission to the residence over the twisted wire pair drop cable 180. A controller 662, which can be any suitable microcontroller, is used to configure and program the VDSL system ASIC 654.

Power is added via a power connector 650, and a current limiting circuit 656 prevents overcurrents, and a line protection power insertion module 664 permits the combining of the VDSL signal and the powering voltage, which in a preferred embodiment is −90 V and in an alternate embodiment is −130 V. At the twisted wire pair drop cable 180 leaving the combined digital telephony and data xDSL line side modem 660 a line side twisted wire pair with power interface 666 is formed.

The subscriber side is illustrated in FIG. 11B, where a subscriber side twisted wire pair with power interface 667 is formed, and connects to a combined digital telephony and data xDSL subscriber side modem 661 via twisted wire pair drop cable 180. Signals with power are received from the combined digital telephony and data xDSL line side modem 660 via the twisted wire pair drop cable 180.

In FIG 11B line protection circuit 670 serves to separate the power and protect the subscriber side VDSL modem 674. Subscriber side VDSL modem 674 separates out the TDM signals containing telephony data and routes that data to a POTs circuit 676. The POTs circuit 676 generates an analog telephony signal which is routed to a twisted wire pair connector assembly 682, which contains a derived first line POTs connector 690, which in a preferred embodiment is an RJ-11 jack.

An optional POTs/ISDN circuit 678 may be present and supports an additional POTs or ISDN line which can be connected via a derived second line POTs or ISDN connector 692 which is present in twisted wire pair connector assembly 682.

In the embodiment shown in FIG. 11B, a coaxial modem 680 also receives and transmits digital data to subscriber side VDSL modem 674. Coaxial modem 680 can take information from subscriber side VDSL modem 674 and generate a coaxial signal, which in a preferred embodiment is the Digital Audio Visual International Council (DAVIC) profile A type signal. The coaxial signal generated by coaxial modem 680 is routed to a coaxial modem connector 694, and subsequently to a combiner 696. The combiner 696 permits combining of the signal from coaxial modem 680 with off-air broadcast television signals which come from an antenna or cable TV system connected to off-air connector 695. The inside wiring network interface 697 has both the analog POTs signals and digital data signals.

Although the embodiment illustrated in FIGS. 11A and 11B show the subscriber side modem and line side modem as VDSL modems, ADSL or other types of modems can be used to realize the invention.

The combined digital telephony and data xDSL subscriber side modem 661 can also be located in gateway 200, and as illustrated in FIG. 3, a variety of devices can be directly connected to the gateway using twisted wire pair, coaxial cable, or other types of wiring.

Figure 12A:
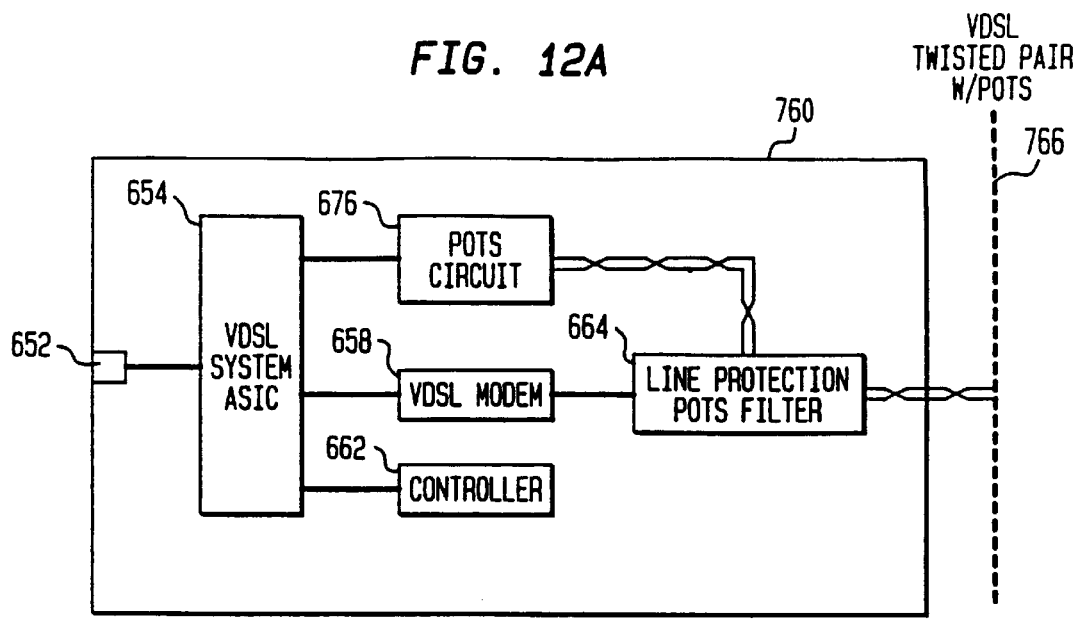
FIG. 12A illustrates the USAM linecard for xDSL applications using local powering.
Figure 12B:
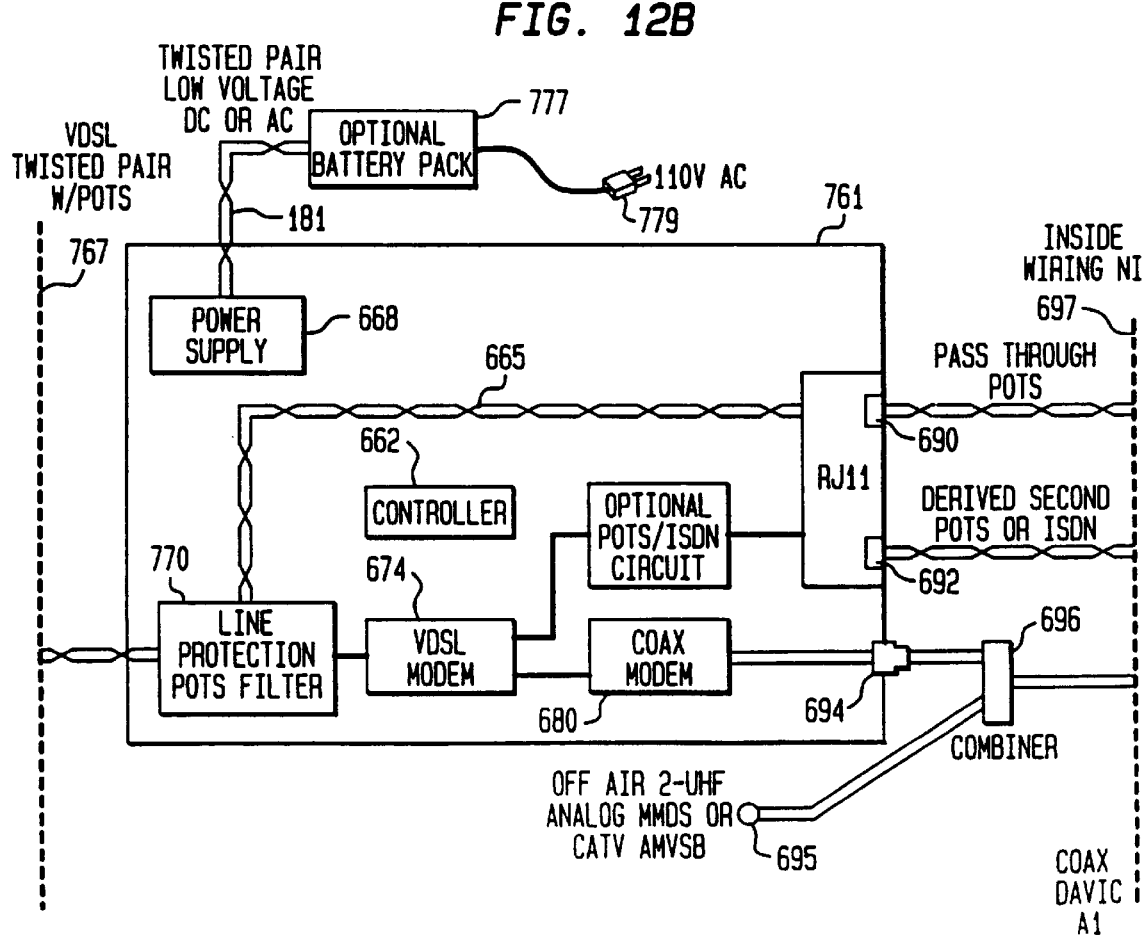
FIG. 12B illustrates the ANID for xDSL applications using local powering.

FIGS. 12A and 12B illustrate an alternate embodiment for transmitting telephony signals along with xDSL data signals. In this embodiment the analog POTs signal is generated on a POTS circuit 676 which is located in a combined analog telephony and data xDSL line side modem 760 which is located in USAM 340. Referring to FIG. 12A, the POTs circuit 676 generates an analog telephone signal which is combined with a digital data signal from VDSL modem 658 in the line protection power insertion module 664 which serves as a line side diplex filter 418. The combined analog telephony signal and digital data signal is present at the line side xDSL twisted wire pair with POTs interface 766.

At the subscriber side, a combined analog telephony and data xDSL subscriber side modem 761 is used to receive the POTs and data signals from a VDSL/POTs twisted pair interface 767. In a preferred embodiment, powering from the residence 190 is used via an AC plug 779 and power supply 668. An optional battery pack 777 can be used to provide power to the combined analog telephony and data xDSL subscriber side modem 761 in the event the AC power in the residence 190 fails. Power from the AC plug 779 or optional battery pack 777 is transmitted to power supply 668 using conventional two conductor power cable or inside twisted wire pairs 181.

The combined analog telephony and data xDSL subscriber side modem functions for data according to the description for the data portion of the combined digital telephony and data xDSL line side modem 660. The line protection POTs filter 770 serves to separate the analog telephony signal from the digital data signal and serves to protect VDSL modem 674 and telephone 194 from excessive currents.

In the traditional approach to combining analog telephony signals with xDSL data signals (as shown in FIG. 4) the analog POTs signal is externally combined with the xDSL signal in the line side diplex filter 418. The principal problems with this approach are that there are two twisted wire pairs from the cross connect frame (the connection location for twisted wire pair drop cables 180 coming from the telephone central office) two sets of lightning protection, and unknown characteristics in terms of the trip ring and other impulse noise on the POTs line which could be detrimental to the xDSL signal. By having the POTs circuit 676 integrated onto the combined analog telephony and data xDSL line side modem it is possible to control the interference between the data signals generated by line side VDSL modem 658 and the analog POTs signal. This embodiment minimizes the amount of lightning protection required, as well as assuring that the impulse noise generated by the POTs circuit is characterized and controllable. In addition, a feeder pair from the central office is liberated for reuse.

The embodiment illustrated in FIGS. 12A and 12B show the subscriber side modem and line side modem as VDSL modems, ADSL or other types of modems can be used to realize the invention.

The combined analog telephony and data xDSL subscriber side modem 761 can also be located in gateway 200, and as illustrated in FIG. 3, a variety of devices can be directly connected to the gateway using twisted wire pair, coaxial cable, or other types of wiring.

In transmitting signals to and from BDT 130 to BNU 140 over optical fiber 160, or to and from BDT 130 to USAM 340, a frame structure based on the Synchronous Digital Hierarchy (SDH) standard is utilized in which the most significant bit (bit 1) is sent first and the least significant bit (bit 8) is sent last. A system specific datalink channel is sent within the SDH frame. The SDH frame itself has 2430 bytes in a 125 μs frame, divided into overhead areas, a 41 cell payload area and a 3 byte footer which is not used.

The downstream ATM data (BDT 130 to BNU 140 or BDT 130 to USAM 340) is carried in a cell format illustrated in FIG. 13A, in which 4 system specific bytes form a downstream header 1004 which is added to a 53 byte ATM cell 1002. The first two bytes in the header, 1006 and 1008, are left unused, while the following two bytes contain two BIU 152 routing tags, BIU routing tag high byte 1010, and BIU routing tag low byte 1012. An ATM Virtual Path Indicator/Virtual Channel Indicator (VPI/VCI) and cell header field 1014 are also present. A Header Error Control (HEC) field 1016 contains an error correction code word which covers the header 1004 and the VPI/VCI cell header field 1014. Data is carried within the an original downstream ATM data field 1018.

Upstream ATM data is carried in a cell format illustrated in FIG. 13B, in which 4 system specific bytes form an upstream header 1005, which contains two unused bytes 1026 and 1028, an ODU source ID byte 1030, and a TCAM ID byte 1032. An ATM VPI/VCI cell header field 1014 is also present, as is an HEC field 1016. An ATM cell 1002 of 53 bytes contains the ATM data, including an original stream ATM data field 1038.

Figure 14A:
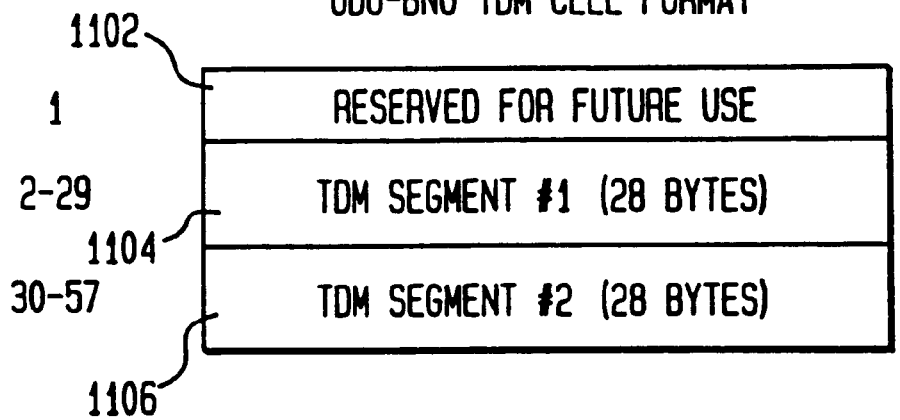
FIG. 14A illustrates the Time Division Multiplexing (TDM) cell format for transmissions from the BDT to the BNU or USAM.

Time Division Multiplex (TDM) data is carried in both directions on optical fiber 160 (BDT 130 to BNU 140 or BDT 130 to USAM 340)as well as on the twisted wire pairs 423 used to form the BDT-USAM link in a cell format of 57 bytes. In both directions, the TDM cell consists of two segments of 28 bytes and a TDM cell reserved byte, as illustrated in FIG. 14A, in which a 57 byte TDM cell is comprised of a TDM cell reserved byte 1102, a first TDM segment 1104, and a second TDM segment 1106.

Figure 14B:
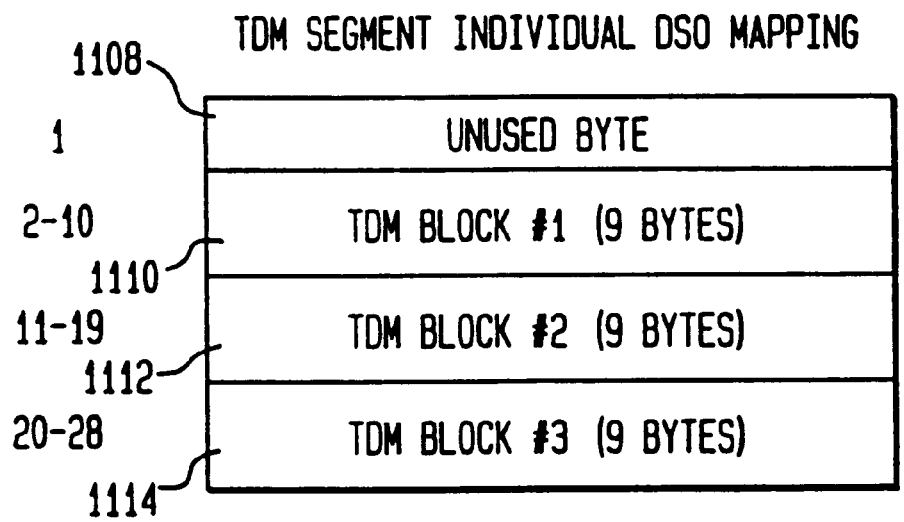
FIG. 14B illustrates the TDM segment individual DSO mapping.

As illustrated in FIG. 14B, the individual DS0s within the TDM segments are mapped into three TDM blocks of nine bytes each. A reserved segment byte 1108 precedes a first TDM block 1110, a second TDM block 1112, and a third TDM block 1114.

Figure 14C:
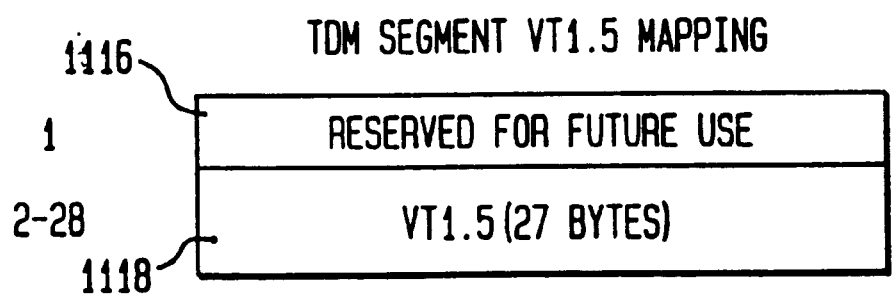
FIG. 14C illustrates the TDM segment VT1.5 mapping.

An asynchronous virtual tributary (VT 1.5) can be transported in a TDM segment as illustrated in FIG. 14C by sending one reserve VT 1.5 byte 1116 followed by a 27 byte VT1.5 field 1118.

Figure 15:
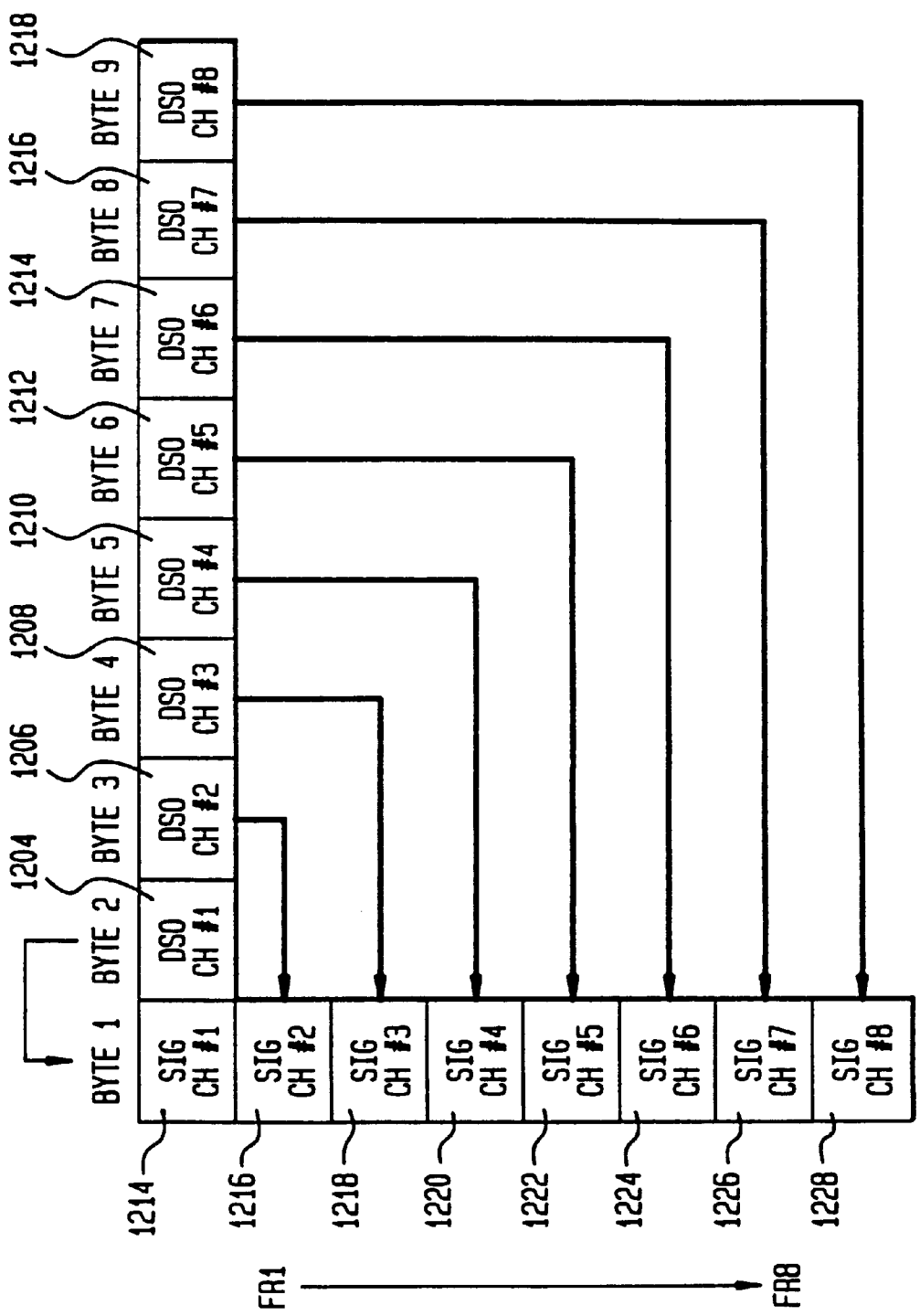
FIG. 15 illustrates the basic TDM block DSO mapping.

The particular mapping of DS0s in a TDM block is illustrated in FIG. 15, where eight DS0 channels are transported in bytes 2–9 (1204, 1206, 1208, 1210, 1212, 1214, 1216, and 1218 respectively). The signaling information for each DS0 is transported in a signaling byte. The signaling byte is the first byte in the nine byte sequence which forms a frame, and each of eight frames carries the signaling information for one DS0 channel. As shown in FIG. 15, channel 1 signaling byte 1214 appears as the first byte of frame 1, channel 2 signaling byte 1216 as byte 1 of frame 2. Channel 3–8 signaling bytes (1218, 1220, 1222, 1224,1226, 1228 respectively) appear in the first byte of frames 3–8 respectively.

An advantage of transmitting the voice and data information in an ATM format is that cells are routed to their destination regardless of data type, and no discrimination needs to be made between TDM voice signals and high speed data. The destination can be a BIU 152, USAM linecard plug-in 920, ANID 610, PID 196, television set-top 198, computer with NIC card 191, telephony interface unit 710, LAN unit 720, or gateway 200.

The mapping of cells occurs at both the network side, where cells are formed from the data received from ATM network 110, and from PSTN 100, and at the subscriber side, where the different devices generate TDM voice information or high speed data. As an example, a PID 196 would generate TDM information and a television set-top 198 or computer with NIC card 191 would generate high speed data. The devices in the residence or the gateway 200 would map the information into ATM cells for transmission on the Unified Access Platform.

In a preferred embodiment the mapping of TDM information into ATM cells, and the formation of the headers, is performed in one or more Application Specific Integrated Circuits (ASICs). Methods for the implementation of such ASICs are well known to those skilled in the art. In an alternate embodiment the mapping of TDM and high speed data information can be performed in software.

Within BDT 130 the mapping of TDM information into cells allows for the efficient routing of those cells to the individual Optical Distribution Units (ODUs) in the BDT which generate and receive optical signals from BNUs 140 or USAMs 340. In a preferred embodiment there are 64 ODUs in BDT 130. Furthermore, a BDT common control card controls the routing of cells to the individual ODUs in BDT 130.

The use of ATM cells in BDT 130 and over optical fiber 160 allows voice and data information to be simultaneously routed from one BDT 130 to BNUs 140, USAM ADSL-RT 520, USAM ADSL-CO 510, and USAM VDSLs 620, where traditional analog telephone signals can be generated along with high speed data signals. Because the transmission technique and media for transmission of high speed data signals will vary from installation to installation, it is important to be able to support the various xDSL and coaxial drop cable networks from one Unified Access Platform.

Use of the mappings for TDM and ATM services presented in FIGS. 13–15 allow for transport of both TDM and ATM services to BNUs 140, USAM ADSL-RT 520, USAM ADSL-CO 510, and USAM VDSLs 620, but the transmission scheme does not comply with all aspects of standard ATM cell transmission. Although a proprietary definitions based on extended ATM cells can be used for transmissions from these devices to the subscriber, it is beneficial to use standard ATM cells, and develop mappings which support both data and telephony within standard ATM cells.

In a preferred embodiment, a USAM ADSL-RT 20 or a USAM ADSL-CO 510 is used to support the delivery of both data and telephony services by combining these services into one ATM based transport stream, sending that signal to the residence 190 over twisted wire pair drop cable 180 in a signal format which complies with the American National Standards Institute (ANSI) T1E1.4 Standards Project for Interfaces Relating to Carrier to Customer Connection of Asymmetrical Digital Subscriber Line (ADSL) Equipment, T1-413, Issue 2 (released Apr. 4, 1998) or the International Telecommunications Union G.lite ADSL specification, both of which are incorporated in their entirety herein. The signal sent over twisted wire pair drop cable 180 is in an ATM cell format and contains ATM cells which contain data signals as well as ATM cells which contain digital telephony signals.

Figure 16A:
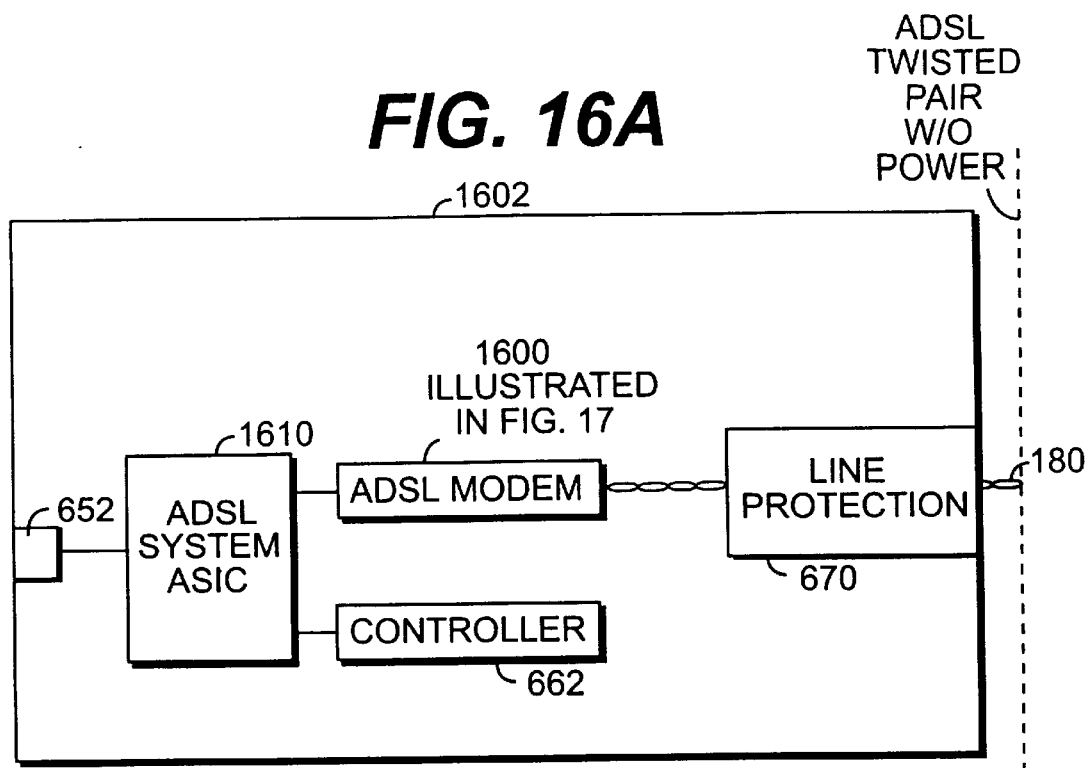
FIG. 16A illustrates an ADSL linecard.
Figure 16B:
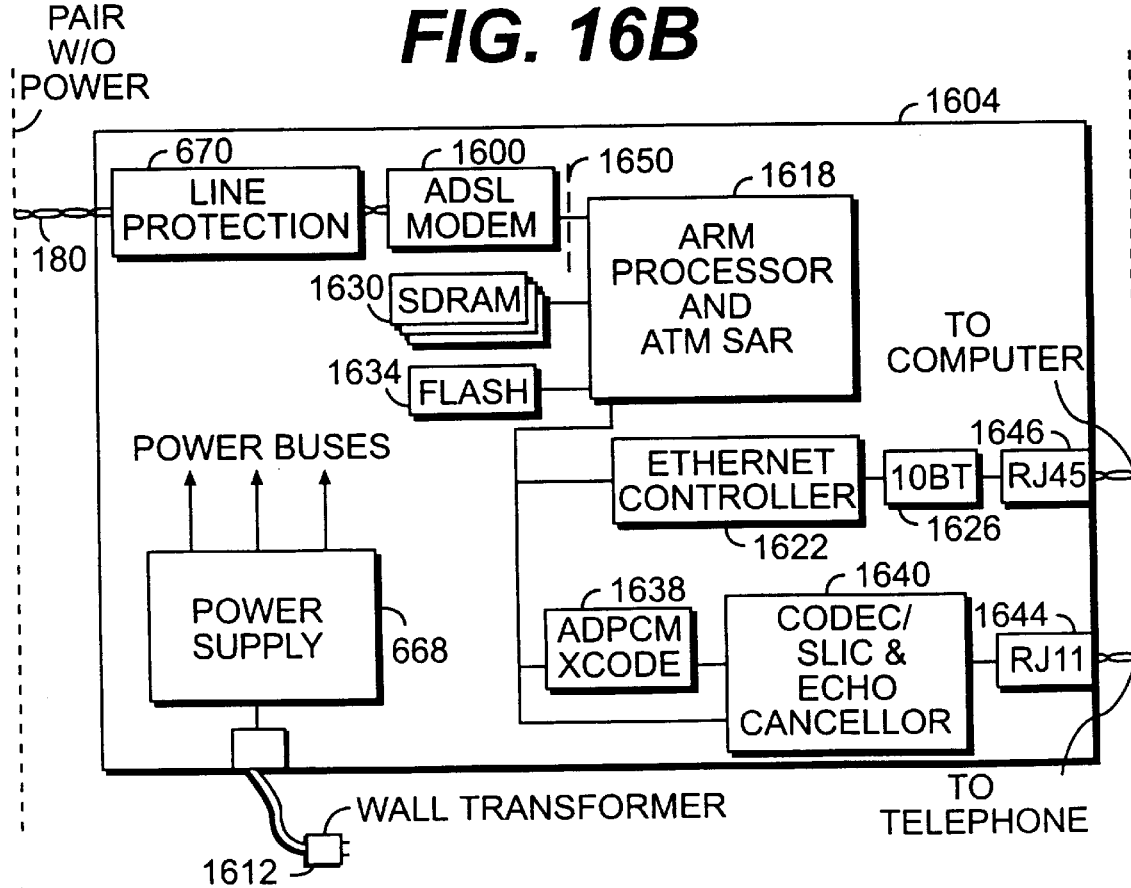
FIG. 16B illustrates a block diagram of customer premises unit capable of providing derived telephony and data.

In a preferred embodiment the combined voice and data signals are transmitted from an ADSL linecard 1602, illustrated in FIG. 16A, which is located in USAM ADSL-RT 520 or in USAM ADSL-CO 510, and received at a combined data and telephony unit 1604, illustrated in FIG. 16B, which is located at the subscriber side of the network. The combined data and telephony unit 1604 can support both data and voice services, and thus combines aspects of the telephony interface unit 710, LAN unit 720, Network Interface Card (NIC) 191, and Premises Interface Device (PID) 196. In an alternate embodiment, the combined data and telephony unit 1604 can form part of gateway 200, which can have additional video functionality.

A feature of the transmission system based on ADSL linecard 1602 and combined data and telephony unit 1604 is the ability to transmit a varying number of voice channels along with data. As will be discussed herein, this can be accomplished by having a variable telephony payload mapping in which 64 kb/s, 32 kb/s, or 16 kb/s voice channels are carried in ATM cells. These voice carrying ATM cells can be mixed with data ATM cells to provide transport of both voice and data. Additionally, since the number of voice channels and the bandwidth dedicated to voice services can be varied, the system provides for the ability to tradeoff between capacity and voice quality—64 kb/s streams carry voice signals in an uncompressed Pulse Code Modulation (PCM) voice format, while 32 kb/s and 16 kb/s streams carry voice signals in a compressed Adaptive Differential Pulse Code Modulation (ADPCM) format.

Fax and dial-up data (modem) signals can be transported in the voice channels, with 64 kb/s and 32 kb/s channels supporting these applications. The 16 kb/s channels provide acceptable quality voice but do not always support fax and dial-up data (modem) signals.

The architecture of the ADSL linecard 1602 is illustrated in FIG. 16A. ADSL linecard 1602 is connected to the USAM via a USAM backplane bus connector 652. An ADSL system ASIC 1610 supports formatting of signals in a manner which is compliant with ADSL modem 1600. The ADSL system ASIC 1610 can be controlled by controller 662.

ADSL system ASIC 1610 receives both TDM and ATM information originating from PSTN 100 and ATM network 110 and forms data carrying ATM cells as well as ATM cells carrying TDM information which can include DS0 circuits carrying voice, fax or data transmitted over a dial-up modem. In a preferred embodiment, ADSL system ASIC supports 64 kb/s Pulse Code Modulation (PCM) encoding and decoding, as well as 32 kb/s and 16 kb/s Adaptive Differential Pulse Code Modulation (ADPCM) which allows for the transmission of DS0 based services in a reduced bandwidth, with an acceptable compromise in quality. Such transmission techniques are well understood by those skilled in the art and are explained in the text entitled "Subscriber Loop Signaling and Transmission," by Whitham D. Reeve, published by the Institute of Electrical and Electronics Engineers in New York in 1995, and which is incorporated herein by reference.

The line protection circuit 670 protects ADSL modem 1600 from harmful network signals, and connects to twisted wire pair drop cable 180 which runs to the residence 190. ADSL linecard 1602 can receive both TDM telephony and ATM data signals and generates a digital subscriber loop signal for transmission to the residence over twisted wire pair drop cable 180. In a preferred embodiment the digital subscriber loop signal is in an ADSL format corresponding to the proposed G.lite ADSL specification submitted to the International Telecommunications Union (ITU) or the American National Standards Institute (ANSI) T1.413 issue 2 standard Discrete Mulitone (DMT) transmission standard.

FIG. 16B illustrates a combined data and telephony unit 1604 which receives data from and sends data to ADSL linecard 1602 illustrated in FIG. 16A. Referring to FIG. 16B the combined data and telephony unit 1604 receives the digital subscriber loop signal via twisted wire pair drop cable 180, with line protection circuit 670 protecting ADSL modem 1600 from harmful voltages. The output of ADSL modem 1600 is compliant with the ATM Universal Test & Operations Physical Interface (UTOPIA) as specified by the ATM Forum and thus forms a UTOPIA interface 1650 an Advanced RISC Machine (ARM) processor and ATM Segmentation and Reassembly (SAR) 1618. A Synchronous Dynamic Random Access Memory (SDRAM) 1630 and electrically alterable flash memory 1634 are used in conjunction with ARM processor and ATM SAR 1618. An example of an ARM processor and ATM SAR is part number IC-000082 offered by the Virata corporation under the trademark HYDROGEN. Suitable alternatives are known to those skilled in the art.

ARM processor and ATM SAR 1618 provides the functions of receiving ATM cells and reconstructing the service packets and TDM data streams which were received at BDT 130. In a preferred embodiment, data is passed from ARM processor and ATM SAR 1618 to Ethernet controller 1622 which handles communications protocols according to the Ethernet specification, and which is connected to a 10BASET (10BT) Ethernet driver circuit 1626. 10BT Ethernet driver circuit 1626 complies with the 10BASET physical layer specification which supports transmission of 10

Mb/s data over unshielded twisted wire pairs. 10BT Ethernet driver circuit is connected to a user data interface 1646 which in a preferred embodiment is an RJ45 receptacle.

An Adaptive Differential Pulse Code Modulator (ADPCM) transcoder 1638 receives time division multiplex information which originates from PSTN 100 and encodes and decodes ADPCM information. A combination Coder-Decoder Subscriber Line Interface Circuit (CODEC/SLIC) and echo cancellor 1640 provides the functions of interfacing the digital signals to an analog telephone, as well reducing the effects of echo due to packetization and transport delays. An example of an echo-canceling codec is the CS6403 application specific digital signal processor offered by the Crystal Semiconductor Products Division of Cirrus Logic, Inc. A number of CODEC/SLIC devices can be used in the combination CODEC/SLIC and echo cancellor 1640 and are well known to those skilled in the art.

The combination CODEC/SLIC and echo cancellor 1640 is connected to a user telephony interface 1644 which in a preferred embodiment is an RJ-11 telephone receptacle.

A wall transformer 1612 connects to a AC outlet and provides a DC voltage to power supply 668 which distributes power throughout combined data and telephony unit 1604.

Figure 17:
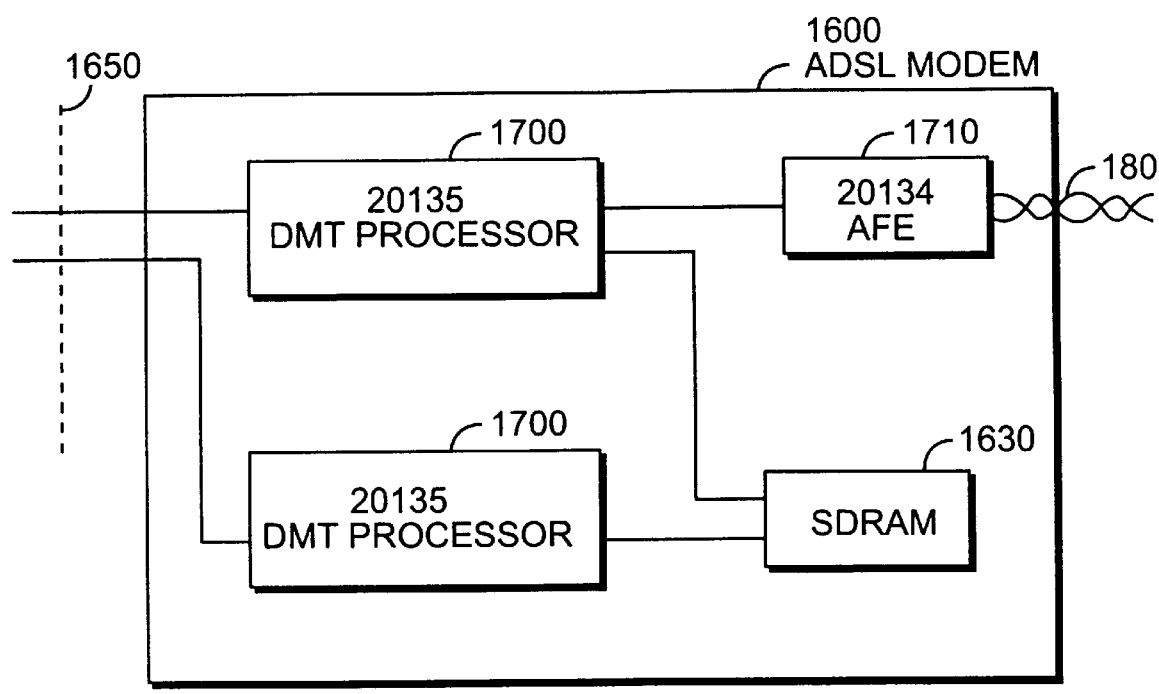
FIG. 17 illustrates a block diagram of an ADSL modem.

FIG. 17 illustrates in greater detail the ADSL modem 1600 which is comprised of two Discrete Multi-Tone (DMT) processors 1700. In a preferred embodiment DMT processor 1700 is the MTC-20135 ADSL DMT transceiver with ATM framer offered by the Alcatel corporation. DMT processor 1700 supports both receive and transmit functions including coding and decoding, equalization, mapping of DMT carriers, ADSL framing and deframing, and ATM cell specific deframing. SDRAM 1630 is used to support DMT processor 1700.

DMT processor 1700 is connected to an analog front end (AFE) 1710, which in a preferred embodiment is an MTC-20134 Integrated ADSL Complementary Metal Oxide Semiconductor (CMOS) Analog Front End Circuit offered by the Alcatel Corporation. AFE 1710 provides the analog to digital and digital to analog conversion functions for interfacing the digital signals to the twisted wire pair drop cable 180.

Alternate devices with similar or additional functionality can be utilized to realize ADSL modem 1600 and are known to those skilled in the art.

Figure 18:
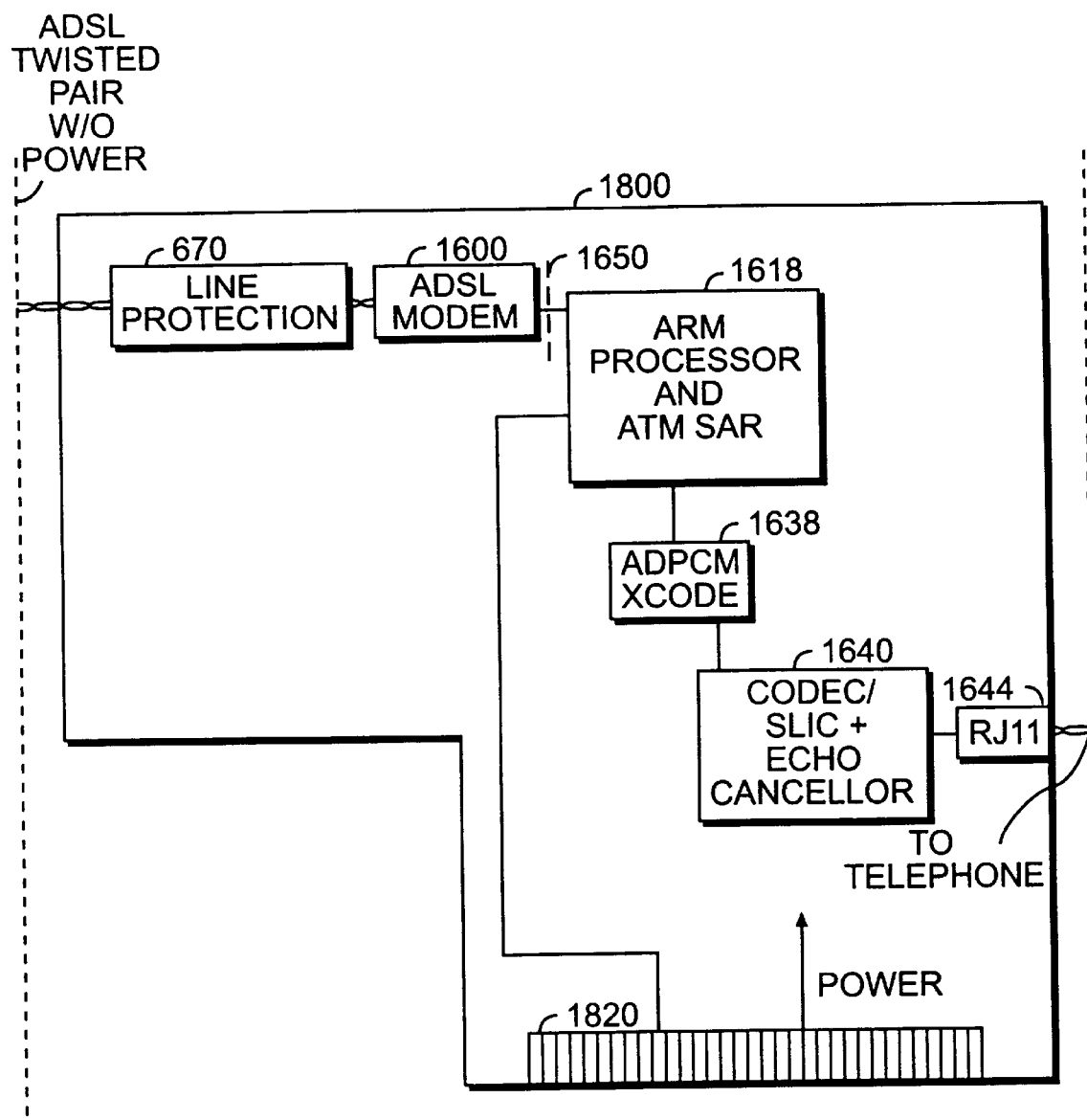
FIG. 18 illustrates a network interface card supporting derived telephony.

FIG. 18 illustrates a network interface card supporting derived telephony 1800 which receives a digital subscriber loop signal via twisted wire pair drop cable 180 at line protection circuit 670 which transmits the signal to ADSL modem 1600. Data is passed across UTOPIA interface 1650 and is received at ARM processor and ATM SAR 1618, which passes data to computer backplane connector 1820 for distribution within a computer, and TDM information to ADPCM transcoder 1638, connected to combination CODEC/SLIC & echo cancellor 1640 which derives analog telephony signals for presentation at user telephony interface 1644, which in a preferred embodiment is an RJ-11 receptacle.

The network interface card supporting derived telephony 1800 can be inserted in a personal computer, and provides connectivity to data services transmitted in the ADSL format, as well as he ability to derive analog telephony services. In a preferred embodiment computer backplane connector 1820 complies with the Peripheral Component Interconnect (PCI) bus standard. The user can thus insert the card into the personal computer, connect the ADSL line to the card, and connect an analog telephone, fax machine, or dial-up modem to the RJ-11 jack. Power for the network interface card supporting derived telephony 1800 is received from the computer power supplies via the PCI bus.

Figure 19A:
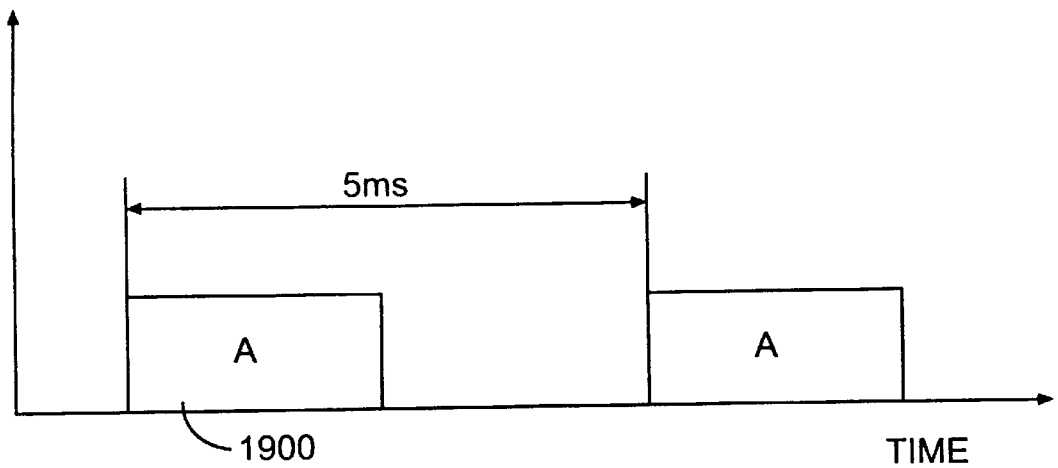
FIGS. 19A–C illustrate timing and cell spacing for ATM cells carrying digital telephony signals.
Figure 19B:
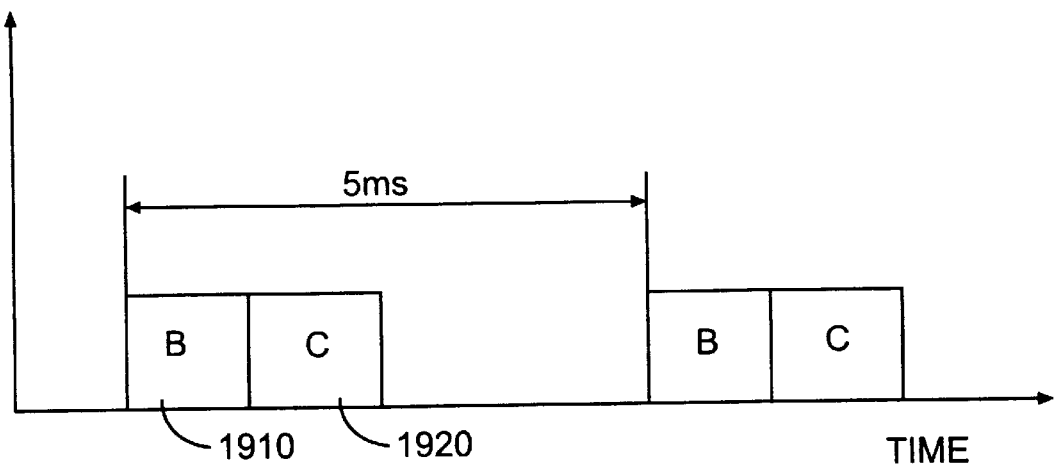
Figure 19C:
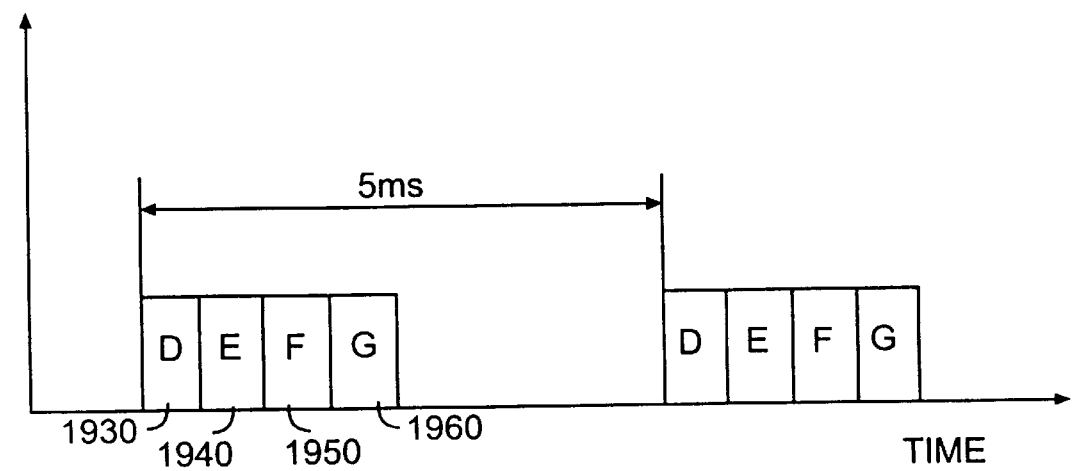

FIGS. 19A through 19B illustrate timing and cell spacing for ATM cells carrying digital telephony signals. As shown in FIG. 19A payload A 1900 represents 40 bytes of telephony information which originate from a subscriber, and which are transmitted as blocks of 40 bytes every 5 ms, resulting in a data rate of 64 kb/s/. FIG. 19B illustrates the transport of two payloads, payload B 1910 and payload C 1920, each containing 20 bytes of subscriber telephony information transmitted every 5 ms, resulting in a data transfer rate of 32 kb/s. The ADPCM transmission techniques described herein can be used to compress the 64 kb/s digital telephony signals for transmission at 32 kb/s. FIG. 19C illustrates the transport of four payloads, payload D 1930, payload E 1940, payload F 1950, and payload G 1960, each of which contain 10 bytes of telephony information, resulting in a data transfer rate of 16 kb/s.

One advantage of the flexible transport scheme described herein is that different service levels can be provisioned and are fully supported between ADSL linecard 1602 and the combined data and telephony unit 1604 capable of providing derived telephony and data or the network interface card supporting derived telephony 1800. Using payload A 1900 the subscriber obtains a 64 kb/s PCM channel with good quality which support fax and dial-up modem services as well as analog phone (voice) services. Payload B 1901 (or payload C) using ADPCM reduces the quality of the voice slightly but the system generally supports voice, fax and dial-up modem services. When services are provided using payload D 1930 (or payload E 1940, payload F 1950 or payload G 1960) the voice quality is still acceptable but noticeably compressed and the system may or may not support fax transmissions or dial-up modem connections. The flexibility of using the transport system for different grades of services allows the service provider to provision the appropriate service at the appropriate price.

Figure 20:
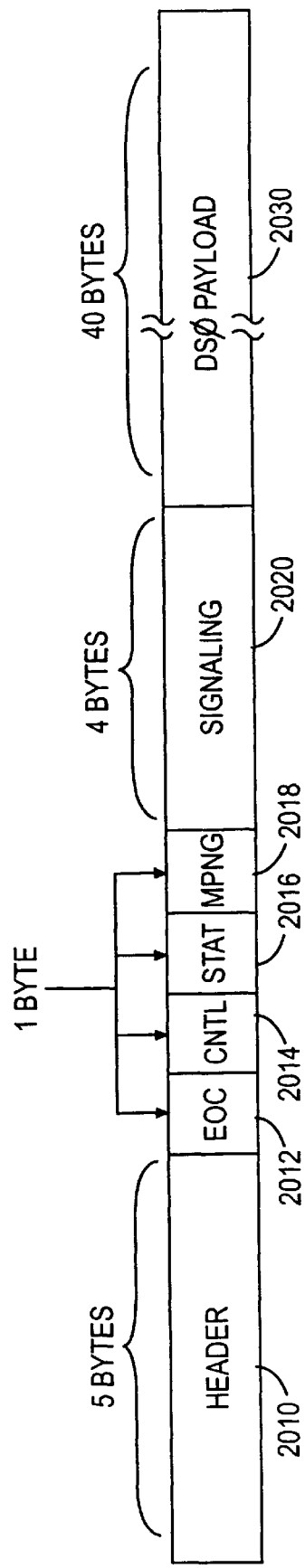
FIG. 20 illustrates an ATM cell mapping for carrying digital telephony signals.

FIG. 20 represents an ATM cell mapping for carrying digital telephony signals utilizing a standard 53-byte ATM cell. The ATM cell mapping illustrated in FIG. 20 includes a standard 5-byte ATM cell header 2010 which in a preferred embodiment contains the standard ATM cell header fields including a Generic Flow Control (GFC) field, a Virtual Channel Identifier (VCI) and Virtual Path Identifier (VPI) field, a Payload Type Identifier (PTI) field, a Cell Loss Priority (CLP) bit and a Header Error Control (HEC) field.

An overhead channel which is comprised of TDM based overhead information is also included in the ATM cell mapping and which in a preferred embodiment is comprised of an Embedded operations Channel (EOC) byte 2012, a control byte 2014, a status byte 2016, and a mapping byte 2018. The EOC byte 2012 can be utilized for the transport of high-level system control, operations and support and maintenance messages between the combined data and telephony unit 1604 or the network interface card supporting derived telephony 1800 and ADSL linecard 1602 as well as in the reverse direction. The control byte 2014 is used for sending control messages between the combined data and telephony unit 1604 or the network interface card supporting derived telephony 1800 and ADSL linecard 1602. Such messages can include messages which can initiate test protocols or activate features of the modem. The status byte 2016 is used to monitor alarms and status from the combined data and telephony unit 1604 or the network interface card supporting derived telephony 1800. Status messages and alarms can be used to indicate the health of the device and monitor the quality of the service being delivered.

A signaling payload 2020 forms part of the ATM cell mapping illustrated in FIG. 20 and in a preferred embodiment is 4 bytes long, and contains ABCD signaling codes sampled twice per cell transmit time. ABCD signaling codes are well known to those skilled in the art and are defined by the GR303 interface standard and provide for call supervision. As an example, PSTN network 100 can initiate ringing, detect off-hook conditions, and generate dial tone using the subscriber line interface circuit of combined CODEC/SLIC & echo cancellor 1640 using ABDC codes.

A digital telephony signal is contained within DSO payload 2030 illustrated in FIG. 20, and contains the TDM PCM or ADPCM information. As previously described, DSO payload 230 may consist of a single 64 kb/s payload from one DSO, or multiple DSO circuits which have been compressed using ADPCM techniques.

Although the present invention has been largely described as signals which originate from PSTN 100 and terminate at equipment in residence 190, it can be clearly understood that the invention described herein support transmissions in the subscriber to PSTN 100 direction.

As an example of the industrial applicability of the present invention, a service provider may have the need to provide both data and voice services based on ADSL transmission techniques which can utilize the existing twisted wire copper pair telephone plant. The service provider can deploy a flexible fiber based local loop system with ADSL linecards located either in the central office or in terminals locat in the field. Signals are received from both a data network and the PSTN and are transmitted to ADSL linecards using a combination TDM and ATM transmission technique.

At the ADSL linecards the TDM information is mapped into standard length ATM cells and transmitted to the residence 190. ATM cells containing data can be interleaved with the ATM cells containing TDM information, with an appropriate spacing being maintained for the ATM cells containing TDM information. This spacing is such that TDM information is delivered at a rate sufficient to maintain the specified data rate for that TDM service.

At the subscriber side, the TDM information is extracted and analog telephony services provided. Data services can be provided simultaneously with analog telephony services from one piece of customer premises equipment using one twisted wire pair. Another advantage of the present invention is that ADPCM compression techniques can be used to provide multiple voice circuits over one ADSL line simultaneously with data.

Although this invention has been illustrated by reference to specific embodiments, it will be apparent to those skilled in the art that various changes and modifications may be made which clearly fall within the scope of the invention. The invention is intended to be protected broadly within the spirit and scope of the appended claims.

What I claim is:

1. In a local loop telecommunications system capable of imultaneous transport of data and telephony services over a fiber optic based infrastructure, a method for simultaneously transporting telephony and data signals to a subscriber location, said method comprising:

a) receiving a digital telephony signal at a broadband digital terminal wherein said digital telephony signal is carried in a Time Division Multiplexed (TDM) format;

b) receiving a data signal at said broadband digital terminal wherein said data signal is carried in an Asynchronous Transfer Mode (ATM) cell format;

c) combining said digital telephony signal with said data signal to form a combined digital telephony and data signal;

d) transmitting said combined digital telephony and data signal over a fiber optic telecommunications link to an access multiplexor;

e) receiving said combined digital telephony and data signal at said access multiplexor;

f) generating a digital subscriber loop signal on a linecard located in said access multiplexor wherein said digital subscriber loop signal contains a digital telephony carrying Asynchronous Transfer Mode (ATM) cell which contains a Time Division Multiplexed (TDM) payload containing said digital telephony signal, a signaling payload and an overhead payload and wherein said digital subscriber loop signal is formed by combining said digital telephony carrying Asynchronous Transfer Mode (ATM) cell with a data carrying ATM cell carrying said data signal;

g) transmitting said digital subscriber loop signal over a twisted wire pair to said subscriber location;

h) receiving said digital subscriber loop signal at a residential receiving device at said subscriber location i) deriving an analog telephony signal from said digital telephony carrying Asynchronous Transfer Mode (ATM) cell contained within said digital subscriber loop signal and presenting said analog telephony signal at a user telephony interface;

j) deriving said data signal from said data carrying ATM cell in said digital subscriber loop signal and presenting said data signal at a user data interface.

2. The method described in claim 1 further characterized in that said digital telephony carrying Asynchronous Transfer Mode (ATM) cell is spaced in time from a subsequent digital telephony carrying Asynchronous Transfer Mode (ATM) cell by a time period of 5 ms.

3. The method described in claim 1 further characterized in that said digital telephony carrying Asynchronous Transfer Mode (ATM) cell carries a single voice channel encoded in a Pulse Coded Modulation (PCM) format with a data rate of 64 kb/s.

4. The method described in claim 1 further characterized in that said digital telephony carrying Asynchronous Transfer Mode (ATM) cell carries two voice channels encoded in an Adaptive Differential Pulse Code Modulation (ADPCM) format with a data rate of 32 kb/s for each voice channel.

5. The method described in claim 1 further characterized in that said digital telephony carrying Asynchronous Transfer Mode (ATM) cell carries four voice channels encoded in an Adaptive Differential Pulse Code Modulation (ADPCM) format with a data rate of 16 kb/s for each voice channel.

6. In a digital local loop telecommunications system, a method of delivering analog telephony services to a subscriber location, said method comprising:

a) receiving a digital telephony signal at a broadband digital terminal wherein said digital telephony signal is in a Time Division Multiplexed (TDM) format;

b) transmitting said digital telephony signal from said broadband digital terminal to an access multiplexor over a fiber optic telecommunications link;

c) receiving said digital telephony signal at said access multiplexor;

d) generating a digital subscriber loop signal on a linecard located in said access multiplexor wherein said digital subscriber loop signal contains a digital telephony carrying Asynchronous Transfer Mode (ATM) cell which contains a Time Division Multiplexed (TDM) payload containing said digital telephony signal, a signaling payload, and an overhead payload;

e) transmitting said digital subscriber loop signal over a twisted wire pair to said subscriber location;

f) receiving said digital subscriber loop signal at a residential receiving device at said subscriber location;

g) deriving a set of telephony control signals from said signaling payload and using said set of telephony control signals to generate ringing and dial tone signals for presentation at an analog telephony user interface;

h) deriving an analog telephony voice signal from said digital telephony signal for presentation at said analog telephony user interface.

7. The method described in claim 6 further characterized in that said digital telephony carrying Asynchronous Transfer Mode (ATM) cell is spaced in time from a subsequent digital telephony carrying Asynchronous Transfer Mode (ATM) cell by a time period of 5 ms.

8. The method described in claim 6 further characterized in that said digital telephony carrying Asynchronous Transfer Mode (ATM) cell carries a single voice channel encoded in a Pulse Coded Modulation (PCM) format with a data rate of 64 kb/s.

9. The method described in claim 6 further characterized in that said digital telephony carrying Asynchronous Transfer Mode (ATM) cell carries two voice channels encoded in an Adaptive Differential Pulse Code Modulation (ADPCM) format with a data rate of 32 kb/s for each voice channel.

10. The method described in claim 6 further characterized further characterized in that said digital telephony carrying Asynchronous Transfer Mode (ATM) cell carries four voice channels encoded in an Adaptive Differential Pulse Code Modulation (ADPCM) format with a data rate of 16 kb/s for each voice channel.

11. In a digital local loop telecommunications system, an apparatus for delivering analog telephony services to a subscriber location, said apparatus comprising:

a) means for receiving a digital telephony signal at a broadband digital terminal wherein said digital telephony signal is in a Time Division Multiplexed (TDM) format;

b) means for transmitting said digital telephony signal from said broadband digital terminal to an access multiplexor over a fiber optic telecommunications link;

c) means for receiving said digital telephony signal at said access multiplexor;

d) means for generating a digital subscriber loop signal on a linecard located in said access multiplexor wherein said digital subscriber loop signal contains a digital telephony carrying Asynchronous Transfer Mode (ATM) cell which contains a Time Division Multiplexed (TDM) payload containing said digital telephony signal, a signaling payload, and an overhead payload;

e) means for transmitting said digital subscriber loop signal over a twisted wire pair to said subscriber location;

f) means for receiving said digital subscriber loop signal at a residential receiving device at said subscriber location;

g) means for deriving a set of telephony control signals from said signaling payload and using said set of telephony control signals to generate ringing and dial tone signals for presentation at an analog telephony user interface;

h) means for deriving an analog telephony voice signal from said digital telephony signal for presentation at said analog telephony user interface.

12. The apparatus described in claim 11 further characterized in that said digital telephony carrying Asynchronous Transfer Mode (ATM) cell is spaced in time from a subsequent digital telephony carrying Asynchronous Transfer Mode (ATM) cell by a time period of 5 ms.

13. The apparatus described in claim 11 further characterized in that said digital telephony carrying Asynchronous Transfer Mode (ATM) cell carries a single voice channel encoded in a Pulse Coded Modulation (PCM) format with a data rate of 64 kb/s.

14. The apparatus described in claim 11 further characterized in that said digital telephony carrying Asynchronous Transfer Mode (ATM) cell carries two voice channels encoded in an Adaptive Differential Pulse Code Modulation (ADPCM) format with a data rate of 32 kb/s for each voice channel.

15. The apparatus described in claim 11 further characterized further characterized in that said digital telephony carrying Asynchronous Transfer Mode (ATM) cell carries four voice channels encoded in an Adaptive Differential Pulse Code Modulation (ADPCM) format with a data rate of 16 kb/s for each voice channel.

16. An apparatus for receiving a digital telephony signal transmitted within a digital telephony carrying Asynchronous Transfer Mode (ATM) cell over a twisted wire pair in a digital subscriber loop telecommunications architecture and for generating an analog telephony signal from said digital telephony signal, said apparatus comprising:

a) means for receiving a digital subscriber loop signal wherein said digital subscriber loop signal contains said distal telephony carrying Asynchronous Mode (ATM) cell which is further comprised of a Time Division Multiplexed (TDM) payload containing said digital telephony signal, a signaling payload, and an overhead payload, wherein said Time Division Multiplexed (TDM) payload is 40 bytes long, and said overhead payload is 4 bytes long;

b) means for transmitting and receiving control signals contained within said overhead payload;

c) means for generating ringing and dial tone signals from said signaling payload for presentation at an analog telephony user interface; and d) means for generating an analog telephony voice signal from said Time Division Multiplexed (TDM) payload for presentation at said analog telephony user interface.

* * * * *